US009904566B2

(12) United States Patent
Itsumi et al.

(10) Patent No.: US 9,904,566 B2
(45) Date of Patent: Feb. 27, 2018

(54) SELECTING VIRTUAL MACHINE PLACEMENT BY COMPUTING NETWORK LINK UTILIZATION AND LINK VARIANCE

(71) Applicant: NEC Corporation, Tokyo (JP)

(72) Inventors: Hayato Itsumi, Tokyo (JP); Yasunobu Chiba, Tokyo (JP); Yusuke Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/392,305

(22) PCT Filed: Jun. 26, 2014

(86) PCT No.: PCT/JP2014/066973
§ 371 (c)(1),
(2) Date: Dec. 24, 2015

(87) PCT Pub. No.: WO2014/208661
PCT Pub. Date: Dec. 31, 2014

(65) Prior Publication Data
US 2016/0147548 A1    May 26, 2016

(30) Foreign Application Priority Data

Jun. 27, 2013  (JP) ................. 2013-134699

(51) Int. Cl.
*G06F 9/50*      (2006.01)
*G06F 9/455*     (2006.01)
*H04L 29/08*     (2006.01)

(52) U.S. Cl.
CPC ........ *G06F 9/45558* (2013.01); *G06F 9/5083* (2013.01); *H04L 67/101* (2013.01);
(Continued)

(58) Field of Classification Search
None
See application file for complete search history.

(56) References Cited

U.S. PATENT DOCUMENTS

2003/0217088 A1    11/2003  Takamoto
2004/0243629 A1*   12/2004  Nomura ................. H04L 67/16
(Continued)

FOREIGN PATENT DOCUMENTS

JP    2003-330740 A    11/2003
JP    2007-004414 A    1/2007
(Continued)

OTHER PUBLICATIONS

Meng et al, Improving the Scalability of Data Center Networks with Traffic-aware Virtual Machine Placement, 2010, IEEE Communications Society, pp. 1-9.*
(Continued)

*Primary Examiner* — Lewis A Bullock, Jr.
*Assistant Examiner* — Bruce S Ashley
(74) *Attorney, Agent, or Firm* — McGinn IP Law Group, PLLC

(57) ABSTRACT

An apparatus includes an input unit that receives a requested resource, and a VM arrangement destination computation unit that predicts traffic volume flowing through a network with the physical machines connected thereto in a case wherein the virtual machine is arranged on the physical machine that conform to a condition specified by the requested resource, and based on the predicted traffic volume, and selects the physical machine that balances a link utilization of the network as an arrangement destination of the virtual machine.

25 Claims, 15 Drawing Sheets

(52) U.S. Cl.
CPC ........... *G06F 2009/4557* (2013.01); *G06F 2009/45595* (2013.01); *G06F 2209/5019* (2013.01)

(56) References Cited

U.S. PATENT DOCUMENTS

| | | | | |
|---|---|---|---|---|
| 2010/0161805 A1* | 6/2010 | Yoshizawa | ............ | G06F 9/5077 709/226 |
| 2012/0304180 A1* | 11/2012 | Imade | .................. | G06F 9/5088 718/102 |
| 2014/0223410 A1 | 8/2014 | Hosono et al. | | |

FOREIGN PATENT DOCUMENTS

| | | |
|---|---|---|
| JP | 2010-146420 A | 7/2010 |
| JP | 2011-095871 A | 5/2011 |
| JP | 2012-243223 A | 12/2012 |
| JP | 2013-054589 A | 3/2013 |
| WO | WO 2012/147825 A1 | 11/2012 |

OTHER PUBLICATIONS

International Search Report (ISR) (PCT Form PCT/ISA/210), in PCT/JP2014/066973, dated Sep. 30, 2014.

"Network Functions Virtualization Introductory White Paper", [Searched on Apr. 1, Heisei 25], Internet <URL:https://portal.etsi.org/NFV/NFV_White_Paper.pdf>.

Y. Honma, et al., "A New Multi-path Routing Methodology Based on Logit Type Assignment." In FutureNet II, 2009.

Yusuke Shinohara, et al., "An Efficient Multipath Routing Algorithm for Datacenter Networks and its Implementation on OpenFlow-based Network", IEICE Technical Report, vol. 109, No. 448, NS2009-164, pp. 13-18, Mar. 2010.

* cited by examiner

|   | 0 | 1 | 2 | 3 | 4 | 5 | 6 | 7 | 8 | 9 |
|---|---|---|---|---|---|---|---|---|---|---|
| 0 | 0 | 0 | 0.5 | 0 | 0 | 0 | 0 | 0 | 0 | 0 |
| 1 | 0 | 0 | 0.4 | 0 | 0 | 0 | 0 | 0 | 0 | 0 |
| 2 | 0.2 | 0.5 | 0 | 0.4 | 0.5 | 0 | 0 | 0 | 0 | 0 |
| 3 | 0 | 0 | 0.4 | 0 | 0.1 | 0.3 | 0.3 | 0 | 0 | 0 |
| 4 | 0 | 0 | 0.3 | 0.1 | 0 | 0.3 | 0 | 0 | 0 | 0 |
| 5 | 0 | 0 | 0 | 0.4 | 0 | 0 | 0.1 | 0.2 | 0 | 0 |
| 6 | 0 | 0 | 0 | 0.3 | 0.2 | 0.3 | 0 | 0.3 | 0 | 0 |
| 7 | 0 | 0 | 0 | 0 | 0 | 0.3 | 0.3 | 0 | 0.2 | 0.4 |
| 8 | 0 | 0 | 0 | 0 | 0 | 0 | 0 | 0.3 | 0 | 0 |
| 9 | 0 | 0 | 0 | 0 | 0 | 0 | 0 | 0.4 | 0 | 0 |

$$\begin{pmatrix} \text{LINK SELECTION} \\ \text{PROBABILITY} \\ \text{MATRIX} \end{pmatrix} \times \begin{matrix} \text{TRAFFIC VOLUME} \\ (\text{src=>dst}) \end{matrix} = \begin{pmatrix} \text{GENERATED} \\ \text{TRAFFIC MATRIX} \\ \text{TM} \end{pmatrix}$$

FIG. 12

$$Estimated\ utilization_{ij} = link\ util_{ij} + {TM_{ij}}/{bw_{ij}}$$

$$= \left( \text{LINK UTILIZATION MATRIX} \right) + \left( \begin{array}{c} \text{GENERATED} \\ \text{TRAFFIC} \\ \text{MATRIX} \\ \text{TM} \end{array} \right) / \text{BW}$$

link util : LINK UTILIZATION MEASURED
TM : GENERATED TRAFFIC MATRIX
bw : BANDWIDTH

VM: SERVICE A

VM: SERVICE B

VM SERVICE C

NUMBER OF VMS : 10

FIG. 14A

|   | 1 | 2 | 3 | 4 | 5 | 6 | 7 | 8 | 9 | 10 |
|---|---|---|---|---|---|---|---|---|---|----|
| 1 | 1 | 1 | 0 | 0 | 0 | 0 | 0 | 0 | 0 | 0  |
| 2 | 0 | 0 | 0 | 0 | 0 | 0 | 1 | 0 | 0 | 0  |
| 3 | 0 | 0 | 0 | 0 | 0 | 0 | 0 | 0 | 0 | 0  |

FIG. 14B

|   | 1 | 2 | 3 | 4 | 5 | 6 | 7 | 8 | 9 | 10 |
|---|---|---|---|---|---|---|---|---|---|----|
| 1 | 0 | 0 | 1 | 0 | 0 | 0 | 0 | 0 | 0 | 0  |
| 2 | 0 | 0 | 0 | 0 | 1 | 0 | 0 | 0 | 0 | 0  |
| 3 | 0 | 0 | 0 | 0 | 0 | 0 | 0 | 1 | 0 | 1  |

FIG. 14C

|   |   | 1 | 2 | 3 | 4 | 5 | 6 | 7 | 8 | 9 | 10 |
|---|---|---|---|---|---|---|---|---|---|---|----|
| 0 | 1 | 0 | 0 | 1 | 0 | 0 | 0 | 0 | 0 | 0 | 0  |
| 0 | 2 | 0 | 0 | 0 | 0 | 1 | 1 | 0 | 0 | 0 | 0  |
| 0 | 3 | 0 | 0 | 0 | 0 | 0 | 0 | 0 | 1 | 0 | 0  |

SELECTING VIRTUAL MACHINE PLACEMENT BY COMPUTING NETWORK LINK UTILIZATION AND LINK VARIANCE

REFERENCE TO RELATED APPLICATION

This application is based upon and claims the benefit of the priority of Japanese Patent Application No. 2013-134699 filed on Jun. 27, 2013, the disclosure of which is incorporated herein in its entirety by reference thereto.

TECHNICAL FIELD

The present invention relates to an apparatus, a method, a system, and a program configured to perform arrangement design of a virtual machine.

BACKGROUND

Interest has increased in virtualization of a network appliance using server virtualization technology or the like developed by IT (Information Technology) technology in networks as well, such as SDN (Software Defined Network) technology that allows a network to be controlled by software, or "NFV" (Network Functions Virtualization) configured to virtualize a network function such as a core network (Core Network), or the like. A lot of dominant telecommunications carriers, vendors, and so on participate in an NFV group of a European standardization organization "ETSI" (European Telecommunications Standards Institute), for example. Various appliances (devices) included in a network (network) of a telecommunications carriers, that are functions of mobile cores, such as MME (Mobility Management Entity), S-GW (Serving-Gateway), P-GW (PDN (Packet Data Network-Gateway), router, large scale NAT (Large Scale Network Address Translations: LSN), HLR (Home Location Register), RNC (Radio Network Controller)/eNodeB, firewall, and authentication server, are currently each constituted from a dedicated apparatus. In NFV, a reduction in equipment cost and operation cost is achieved by implementation of the function by a server virtualization technology using a general-purpose server, for example. By adding a resource for an increase in a communication load such as a control signal, fault tolerance can be increased (with regard to the NFV, refer to Non Patent Literature 1, for example).

With regard to allocation of hardware resources to a virtual machine, Patent Literature 1, for example, discloses a configuration in which an architecture design process of a cloud application in a resource allocation design phase determines the association between a group of virtual machines and physical machines where the respective virtual machines are arranged. Patent Literature 2 discloses a configuration for a physical machine narrowing-down process. In this configuration, a physical machine with a virtual machine created thereon is excluded from a candidate, and it is checked whether there is one candidate physical machine. When the candidate physical machine could be narrowed down to one, the physical machine narrowing-down process is completed. When the candidate physical machine could not be narrowed down to one, the number of virtual machines currently operating on each physical machine is examined using virtual machine IDs in a physical machine configuration. Then, the physical machine having the smallest number of virtual machines is selected. Further, Patent Literature 3 discloses the following configuration. In this configuration, when a computer facility management apparatus receives from an outside an arrangement request requesting arrangement of a new virtual computer, one of a plurality of virtual hardware facilities that is not arranged on a computer facility as a virtual computer is determined as a virtual hardware facility for new arrangement. Then, the determined virtual hardware facility for the new arrangement is arranged on the computer facility as the virtual computer.

CITATION LIST

Patent Literature

[PTL 1]
International Publication No. WO2012/147825
[PTL 2]
JP Patent Kokai Publication No. JP2011-095871A
[PTL 3]
JP Patent Kokai Publication No. JP2013-054589A

Non Patent Literature

[NPL 1]
"Network Functions Virtualization Introductory White Paper", [Searched on April 1, Heisei 25], Internet <URL: https://portal.etsi.org/NFV/NFV_White_Paper.pdf>
[NPL 2]
Y. Honma, M. Aida, H. Shimonishi and A. Iwata, "A New Multi-path Routing Methodology Based on Logit Type Assignment." In FutureNet II, 2009.
[NPL 3]
Yusuke Shinohara, Yasunobu Chiba, Hideyuki Shimonishi, Yudai Honma, Masaki Aida, "An Efficient Multipath Routing Algorithm for Datacenter Networks and its Implementation on OpenFlow-based Network", IEICE Technical Report, vol. 109, no. 448, NS2009-164, pp. 13-18, Mar. 2010.

SUMMARY

The following provides analysis of the related arts.

In virtualization of a network facility or the like, such as NFV, attention is focused on arrangement of a virtual machine. The reason for this is that the following effects are expected. That is, by accommodating virtual machines on the smallest possible number of physical machines, for example, minimization of power consumption may be achieved. Alternatively, by accommodating, on a same physical machine or physical machines that are close to each other, a plurality of virtual machines, in each of which an amount of traffic generated is high, localization of the traffic generated can be achieved.

When virtual machine allocation is not appropriate in network function virtualization, a bias or the like may occur in traffic in the network links. Then, it may become difficult to guarantee network performance, due to concentration of the traffic or the like. Thus, load distribution over an entire network is necessary in virtualization of network function and facility.

The present invention has been devised, based on recognition of the above-mentioned problem. An object of the present invention is to provide a virtual machine arrangement design apparatus, a system, a method, and a program to enable to achieve load distribution of a network in virtualization of a network function.

According to one of some related aspects (aspect 1), there is provided a virtual machine arrangement design apparatus comprising at least:

an input unit that receives a requested resource; and a VM arrangement destination computation unit that selects one or more physical machines, on each of which one or more virtual machine are arranged, based on the requested resource received; wherein the VM arrangement destination computation unit predicts traffic volume flowing through a network with the physical machine connected thereto in a case wherein the virtual machine is arranged on the physical machine conforming to a condition specified by the requested resource, and the VM arrangement destination computation unit selects the physical machine that balances a link utilization of the network as an arrangement destination of the virtual machine, based on the predicted traffic volume.

According to one of the other related aspects (aspect 2), there is provided the virtual machine arrangement design apparatus, wherein a plurality of the virtual machines configured to provide a same function or a same service are arranged on the physical machines that are different, as much as possible.

According to one of the other related aspects (aspect 3), there is provided a virtual machine arrangement design method comprising at least;

receiving a requested resource; and a VM arrangement destination computation selecting one or more physical machines on each of which one or more virtual machines each virtualizing a network function are arranged, based on the requested resource received, wherein the VM arrangement destination computation comprises, predicting a traffic volume flowing through a network with the one or more physical machines connected thereto, in a case wherein the virtual machine is arranged on the physical machine conforming to a condition specified by the requested resource; and selecting the physical machine that balances a link utilization of the network as an arrangement destination of the virtual machine, based on the predicted traffic volume.

According to one of the other related aspects (aspect 4), there is provided a program to cause a computer to execute:

a process that receives a requested resource; and a VM arrangement destination computation process that selects one or more physical machines on each of which one or more virtual machines each virtualizing a network function are arranged, based on the requested resource received, wherein the VM arrangement destination computation process comprises predicting a traffic volume flowing through a network with the one or more physical machines connected thereto, in a case wherein the virtual machine is arranged on the physical machine conforming to a condition specified by the requested resource, and selecting the physical machine that balances a link utilization of the network as an arrangement destination of the virtual machine, based on the predicted traffic volume.

According to one of the other related aspects (aspect 5), there is provided a computer-readable medium (such as a semiconductor memory, or a magnetic/optical disk) storing the program according to the above-mentioned aspect 4.

According to one of the other related aspects (aspect 6), there is provided a communication system comprising:

the virtual machine arrangement apparatus according to the above-mentioned aspect 1;

a unit that provides the requested resource to the virtual machine arrangement apparatus;

the physical machines connected to the virtual machine arrangement apparatus;

the virtual machines connected to the virtual machine arrangement apparatus; and the network connected to the virtual machine arrangement apparatus.

According to the present invention, it is possible to achieve load distribution of a network in virtualization of the network.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modification in various obvious respects, all without departing from the invention. Accordingly, the drawing and description are to be regarded as illustrative in nature, and not as restrictive.

BRIEF DESCRIPTION OF DRAWINGS

FIG. 12 is a diagram illustrating computations of estimation link utilizations in the first exemplary embodiment of the present invention.

FIGS. 14A to 14C are diagrams explaining the second exemplary embodiment of the present invention.

DETAILED DESCRIPTION

Figure 1:
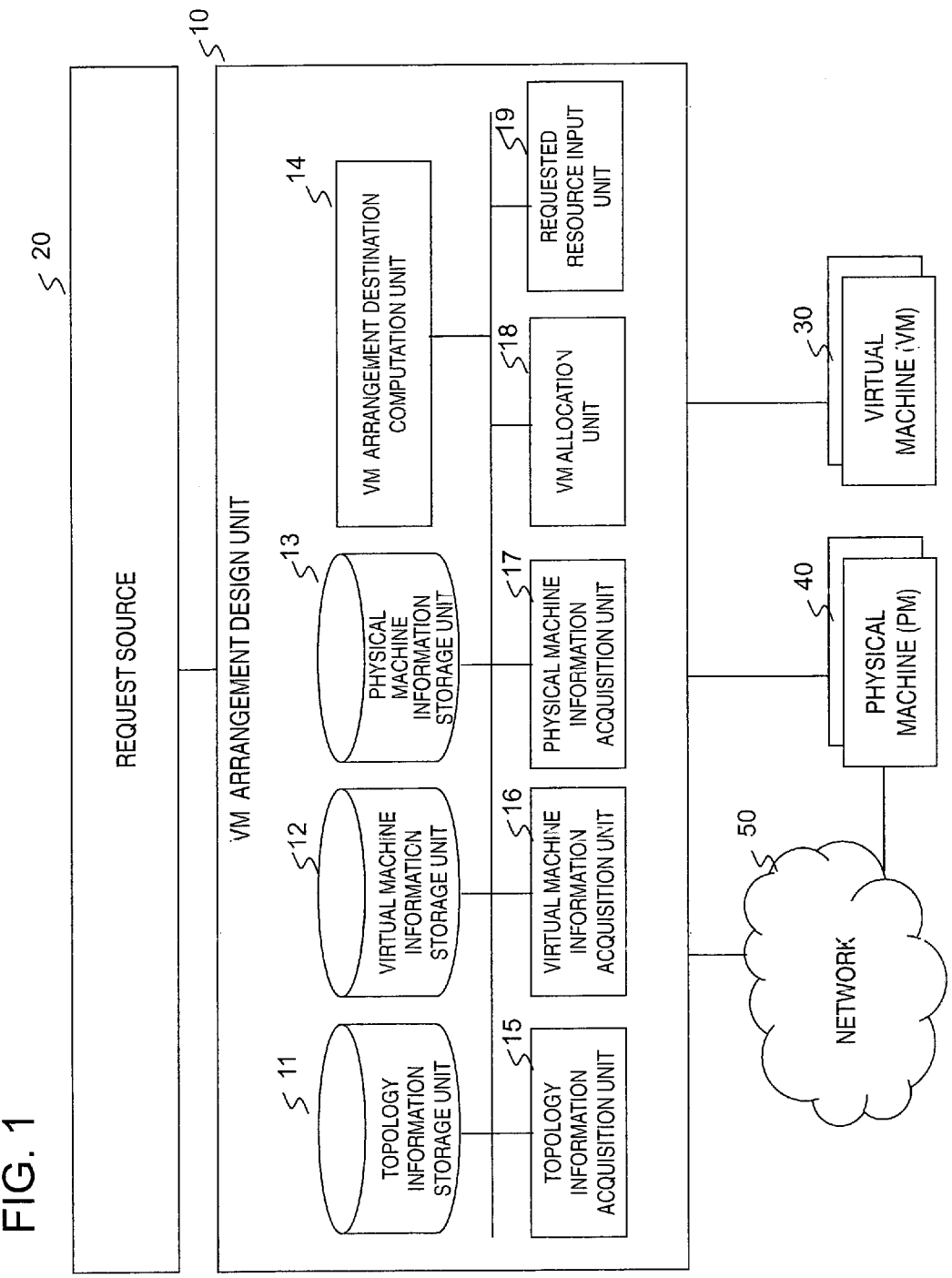
FIG. 1 is a diagram illustrating a configuration of a first exemplary embodiment of the present invention.

The basic concept of the present invention will be described. According to one of preferred modes of the present invention, referring to FIG. 15, a virtual machine arrangement design apparatus (10) includes at least a requested resource input unit (19) that receives a requested resource, and a VM arrangement destination computation unit (14) that selects one or more physical machines (PMs) (40), on each of which one or more virtual machines (VMs) (30) are arranged, based on the requested resource received. The VM arrangement destination computation unit (14) predicts traffic volume flowing through a network (50) with one or more physical machines (40) connected thereto, in a case wherein the virtual machine (30) is arranged on each of the one or more physical machines (40) that conform to a condition specified by the requested resource. Then, the VM arrangement destination computation unit (14) selects the physical machine (40) that balances (uniformizes) a link utilization of the network (50) as the arrangement destination of the virtual machine (30), based on the predicted traffic volume. Though no particular limitation is imposed, referring to FIG. 15, functions of the requested resource receiving unit (19) and the VM arrangement destination computation unit (14) may be implemented by a program to be executed by a computer constituting the apparatus.

More specifically, according to a mode of the present invention, when determining on which one of the physical machines (PMs) the virtual machine (VM) is to be arranged, the VM arrangement destination computation unit (14) computes a link selection probability for each link between a transmission source and a destination to be selected, based on a link utilization measured with respect to each link in the network (50), predicts a generated traffic volume of the link, based on the link selection probability and a traffic volume from the transmission source to the destination, computes an estimation link utilization based on the link utilization and the generated traffic volume, computes a balance degree (such as variance) with respect to the estimation link utilization, and selects the physical machine that balances (uniformizes) the estimation link utilization, based on the balance degree, to set the physical machine as the arrangement destination of the virtual machine.

According to a mode of the present invention, the virtual machine arrangement design apparatus (10) may comprise:

a unit (15 in FIG. 1) that acquires topology information of the network; and a storage unit (11 in FIG. 1) that stores the acquired topology information.

According to a mode of the present invention, the topology information of the network may include link information on links between nodes of the network; and with respect to each link included in a path in the network from the transmission source to the destination and having directivity, the link information may include:

information on a node connected to a start end of the link;

information on a node connected to a terminal end of the link;

a bandwidth of the link; and a utilization of the link.

According to a mode of the present invention, the topology information of the network may include location information of the one or more physical machines in the network.

According to a mode of the present invention, when the one or more physical machines that conform to the condition specified by the requested resource comprise a plurality of the physical machines, the VM arrangement destination computation unit may arrange the virtual machine on each of the physical machines, compute a link utilization matrix (Link_util), where the utilization of the link of the network from a node i to a node j is set to an element in an ith row and a jth column of the link utilization matrix (i=1 to N, and j=1 to N, N being the number of the nodes in the network);

the VM arrangement destination computation unit may compute a link selection probability matrix $P_{od}$ where an element $P_{odij}$ in an ith row and a jth column of the link selection probability matrix $P_{od}$ (i=1 to N, and j=1 to N) is given as:

$$P_{odij} = W_{oi} \times P_{ij} \times W_{jd} \div W_{od}$$

where a matrix W is a matrix in which an element $W_{ij}$ in an ith row and a jth column of the matrix W (i=1 to N, and j=1 to N) indicates a reachability from the node i to the node j, and a matrix P is a matrix where an element $P_{ij}$ in an ith row and a jth column of the matrix P (in which i=1 to N, and j=1 to N) indicates a utility of the link from the node i to the node j, the VM arrangement destination computation unit may compute a traffic matrix TM based on the link selection probability matrix $P_{od}$ and the traffic volume between the transmission source and the destination, the VM arrangement destination computation unit may compute an estimation link utilization matrix (EU), wherein an element $EU_{ij}$ in an ith row and a jth column of the estimation link utilization matrix (EU)(i=1 to N, and j=1 to N) is set, using the following equation:

$$EU_{ij} = \text{Link\_util}_{ij} + \frac{TM_{ij}}{bw_{ij}}$$

or the element $EU_{ij}$ is given as a sum of an element in the ith row and the jth column of the link utilization matrix (Link_util)(in which i=1 to N and j=1 to N) and a value obtained by dividing an element in an ith row and a jth column (in which i =1 to N and j =1 to N) of the traffic matrix TM by a bandwidth $bw_{ij}$ of the link from the node i to the node j, the VM arrangement destination computation unit may next compute a balance degree with respect to the estimation link utilization matrix (EU), using the following equation:

$$\text{link\_variance} = \frac{\left(\sum_{i=1}^{N}\sum_{j=1}^{N} EU_{ij}\right)^2}{N \times \left(\sum_{i=1}^{N}\sum_{j=1}^{N} EU_{ij}^2\right)}$$

where $EU_{ij}$ is the element in the ith row and the jth column of the estimation link utilization matrix (EU)(i=1 to N, and j=1 to N), and the VM arrangement destination computation unit may select the physical machine that uniformizes the estimation link utilization, based on a value of the balance degree obtained for each of the physical machines, and sets the physical machine to the arrangement destination of the virtual machine.

According to a mode of the present invention, the virtual machine arrangement design apparatus may further comprise:

a unit (17 in FIG. 1) that acquires information on the physical machine;

a unit (16 in FIG. 1) that acquires information on the virtual machine;

the storage unit (11 in FIG. 1) configured to store the topology information;

a storage unit (13 in FIG. 1) configured to store information on the physical machines; and a storage unit (12 in FIG. 1) configured to store information on the virtual machine.

According to a mode of the present invention, a plurality of virtual machines configured to provide a same function or a same service may be arranged on physical machines that are different, as much as possible. A description will be given below, in connection with exemplary embodiments.

<First Exemplary Embodiment>

FIG. 1 is a diagram illustrating a configuration of a first exemplary embodiment of the present invention. Referring to FIG. 1, there are provided a request source 20 configured to issue a request for virtual machine (VM) arrangement, a VM arrangement design unit 10 configured to perform designing of virtual machine arrangement, virtual machines 30, physical machines 40 and a network 50.

Though no particular limitation is imposed, the request source 20 may be constituted from OSSs/BSSs (Operation Support Systems/Business Support Systems) of a telecommunications carrier, for example.

Each physical machine 40 may be constituted from a server apparatus or the like. Alternatively, each physical machine 40 may be constituted from a node connected to the network 50 or may be a node provided on the network 50.

Each virtual machine 30 functions as a virtualized appliance obtained by virtualizing a network apparatus or the like, and is allocated on a corresponding one of the physical machines. The VM arrangement design unit 10 performs arrangement design of this virtual machine 30 on the physical machines 40.

The VM arrangement design unit 10 includes a topology information storage unit 11, a virtual machine information storage unit 12, a physical machine information storage unit 13, a VM arrangement destination computation unit 14, a topology information acquisition unit 15, a virtual machine information acquisition unit 16, a physical machine information acquisition unit 17, a VM allocation unit 18, and a requested resource input unit 19.

The topology information storage unit 11 stores topology information of the network 50 acquired by the topology information acquisition unit 15.

The virtual machine information storage unit 12 stores information of a virtual machine 30 acquired by the virtual machine information acquisition unit 16.

The physical machine information storage unit 13 stores information of a physical machine 40 acquired by the physical machine information acquisition unit 17.

The VM allocation unit 18 performs allocation of each virtual machine.

The requested resource input unit 19 (corresponding to requested resource input unit 19 in FIG. 15) receives a request issued from the request source 20 and supplies the request to each of the VM allocation unit 18 and the VM arrangement destination computation unit 14.

Figure 15:
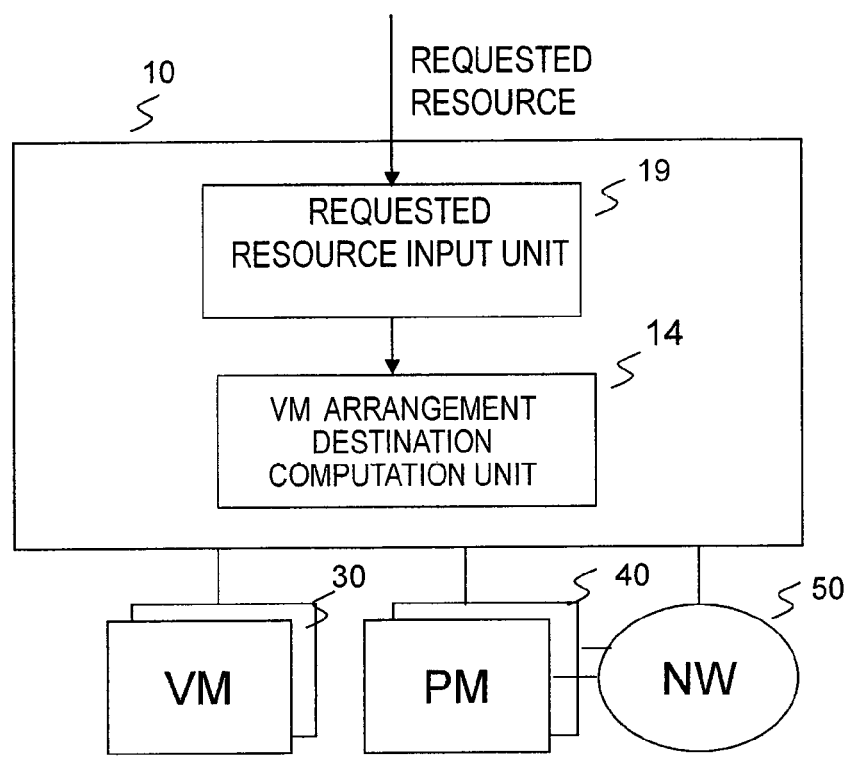
FIG. 15 is a diagram illustrating the basic concept of the present invention.

The VM arrangement destination computation unit 14 (corresponding to VM arrangement destination computation unit 14 in FIG. 15) computes the physical machine (PM) on which one of the virtual machines (VMs) is to be arranged.

The topology information stored in the topology information storage unit 11 includes:

link information; and host location (HOST location). Though no particular limitation is imposed, the link information includes the followings, with respect to each link (connecting a pair of nodes) included in a path in the network from a transmission source to a destination and having directivity:

start end side node of the link (From);

terminal end side node of the link (To);

bandwidth of the link; and utilization of the link.

The utilization of the link in the link information included in the topology information indicates a result of measurement with respect to the network 50. The utilization of the link is acquired from the network 50 by the topology information acquisition unit 15 periodically or when a predetermined event occurs, for example.

The host location (HOST location) included in the topology information is information indicating on which physical machine a virtual machine is arranged.

Though no particular limitation is imposed, the virtual machine information stored in the virtual machine information storage unit 12 includes:

CPU (Central Processing Unit) of a virtual machine;

memory;

service information on host arrangement (indicating to which physical machine a virtual machine belongs). The information indicating to which physical machine a virtual machine belongs is computed by the VM arrangement destination computation unit 14 and is set in the virtual machine.

The physical machine information stored in the physical machine information storage unit 13 includes hardware information of a physical machine such as performance information and capacity information of a CPU, a memory, a storage and so on.

A virtual machine (VM) configured to virtualize a function of a network appliance and a network facility is implemented on a virtual machine monitor (Virtual Machine Monitor) such as a hypervisor that is a virtualization infrastructure of the server apparatus that constitutes a physical machine, for example. It is noted that a virtual machine 30 can be handled with CPU performance, memory capacity, and so forth of the physical machine 40 prepared in advance.

The process and function of each of the units 14 to 19 in FIG. 1 may be implemented by a program executed by a computer.

Figure 2:
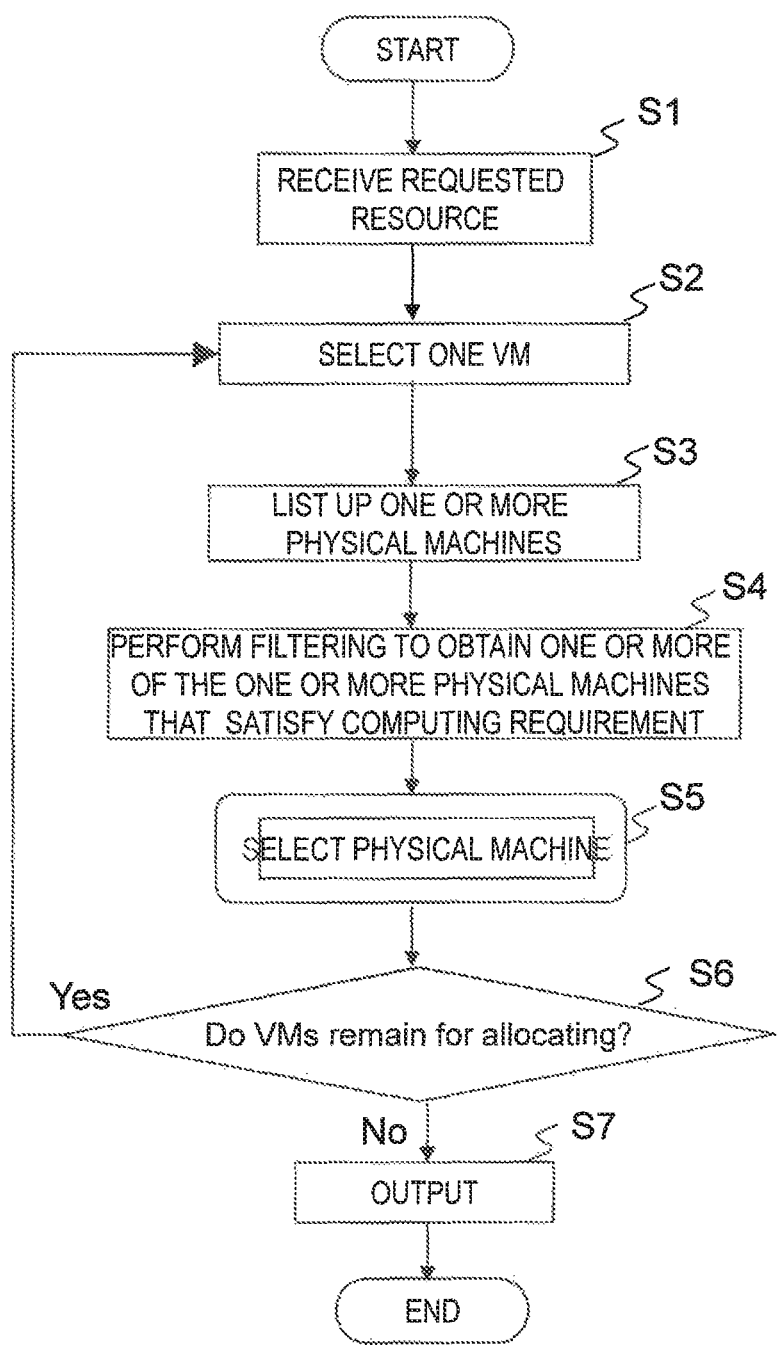
FIG. 2 is a flow diagram illustrating operations of the first exemplary embodiment of the present invention.

FIG. 2 is a flow diagram illustrating operations of the first exemplary embodiment. The operations of the first exemplary embodiment will be described with reference to FIGS. 1 and 2.

The requested resource input unit 19 of the VM arrangement design unit 10 receives a requested resource from the request source 20 (in step S1).

The VM allocation unit 18 of the VM arrangement design unit 10 selects one VM (in step S2).

The physical machine information acquisition unit 17 of the VM arrangement design unit 10 lists up one or more of the physical machines that can be selected (in step S3).

The VM arrangement destination computation unit 14 of the VM arrangement design unit 10 performs sorting (filtering) to obtain one or more physical machines that satisfy a condition (computing requirement) required by the requested resource (in step S4).

The VM arrangement destination computation unit 14 of the VM arrangement design unit 10 selects a physical machine (PM) on which a virtual machine (VM) is to be arranged (in step S5). On that occasion, the VM arrangement destination computation unit 14 refers to the topology information storage unit 1, the virtual machine information storage unit 12, and the physical machine information storage unit 13 and predicts a traffic volume flowing through the network 50 to which are connected one or more physical machines (PMs) obtained by the filtering in step S4, when a virtual machine is arranged in a physical machine, and then selects the physical machine (PM) that balances the utilizations of the links in the network 50, based on the predicted traffic volume.

The procedure returns to step S2 to select a different one of the virtual machines (VM) when there remains virtual machine(s) (VM)(s) for allocation with virtual machine (VM) allocation requested by the requested resource not all completed (Yes branching in step S6). When the allocation of virtual machine (VM) requested by the requested resource is all completed (No branching in step S6), a result of the allocation is output (step S7).

Figure 3:
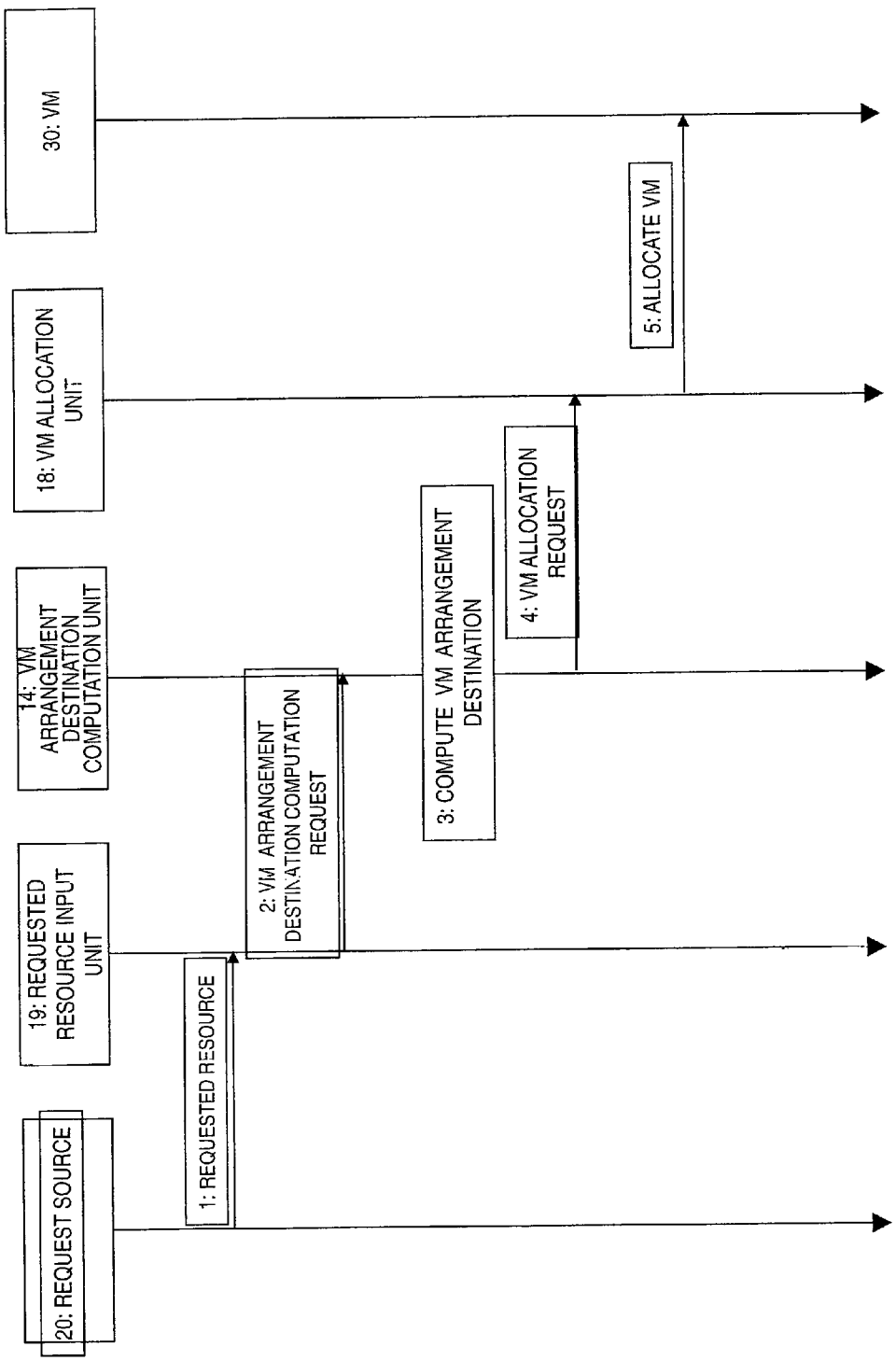
FIG. 3 is a sequence diagram illustrating an operation (VM allocation) in the first exemplary embodiment of the present invention.

FIG. 3 is a diagram illustrating an example of an operation sequence of the virtual machine (VM) allocation (in steps S1 and S2 in FIG. 2). In FIG. 3, a number is given to each sequence. A numeral within parentheses at each end of sentences of the following description corresponds to the number for the sequence. The following describes operation sequence of the virtual machine (VM) allocation with reference to FIG. 3 and FIG. 1.

The requested resource is supplied to the requested resource input unit 19 from the request source 20 (1).

The requested resource input unit 19 transmits a VM arrangement destination computation request to the VM arrangement destination computation unit 14 (2).

The VM arrangement destination computation unit 14 computes a virtual machine (VM) arrangement destination (3).

The VM arrangement destination computation unit 14 transmits a VM allocation request to the VM allocation unit 18 (4).

The VM allocation unit 18 allocates one of the virtual machines (VMs) 30 (5).

Figure 4:
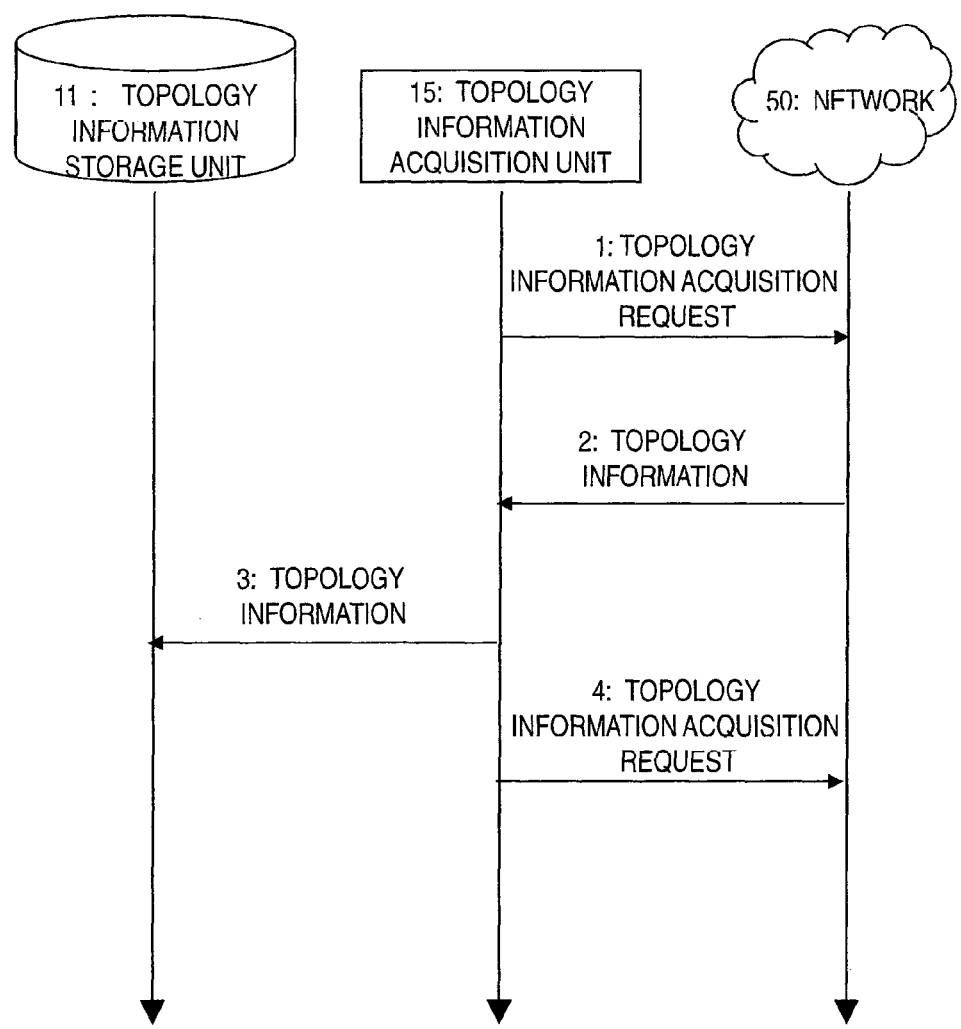
FIG. 4 is a sequence diagram illustrating an operation (topology information acquisition) in the first exemplary embodiment of the present invention.

FIG. 4 is a diagram illustrating acquisition of topology information of the network 50. Referring to FIG. 4, a number is given to each sequence. A numeral within parentheses at each end of sentences of the following description corresponds to the number for the sequence. The following describes an operation sequence for acquisition of the topology information with reference to FIG. 4 and FIG. 1. The topology information acquisition unit 15 transmits a topology information acquisition request to the network 50 (1). The topology information acquisition unit 15 acquires the topology information from the network 50 (2). Specifically, the topology information acquisition unit 15 acquires connection information from each network node. The topology information acquisition unit 15 stores the topology information in the topology information storage unit 11 (3). The topology information acquisition unit 15 transmits a topology information acquisition request periodically or when a predetermined event occurs to hold topology information following a topology change of the network 50 (4).

Figure 5:
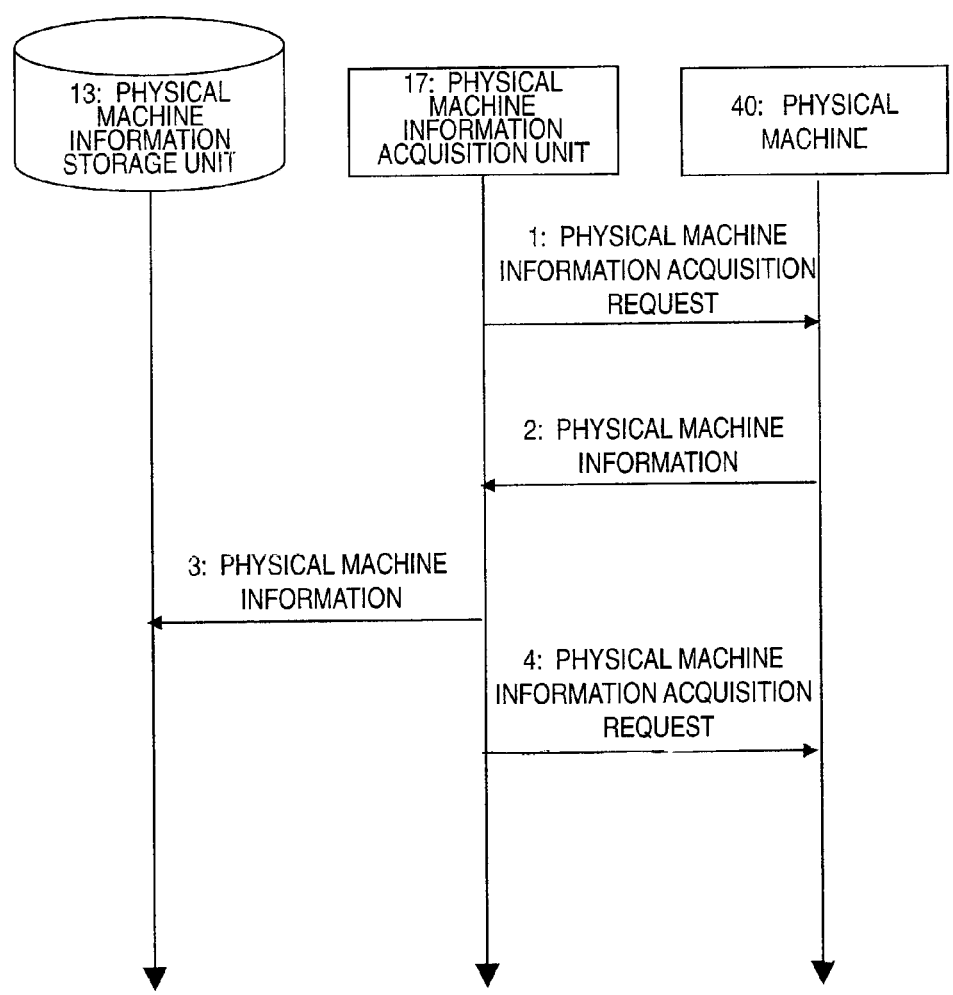
FIG. 5 is a sequence diagram illustrating an operation (physical machine information acquisition) in the first exemplary embodiment of the present invention.

FIG. 5 is a diagram illustrating an example of an operation sequence for acquisition of physical machine information. Referring to FIG. 5, a number is given to each sequence. A numeral within parentheses at each end of sentences of the following description corresponds to the number for the sequence. The operation sequence for acquisition of the physical machine information will be described, with reference to FIGS. 5 and 1. The physical machine information acquisition unit 17 transmits a physical machine information acquisition request to each physical machine 40 (1). Then, the physical machine information acquisition unit 17 acquires the physical machine information from each physical machine 40 (2). The physical machine information acquisition unit 17 stores the physical machine information in the physical machine information storage unit (3). The physical machine information acquisition unit 17 transmits a physical machine information acquisition request to each physical machine 40 periodically or when a predetermined event occurs to hold physical machine information following up-to-date information including a change of the physical machine 40 or the like (4).

Figure 6:
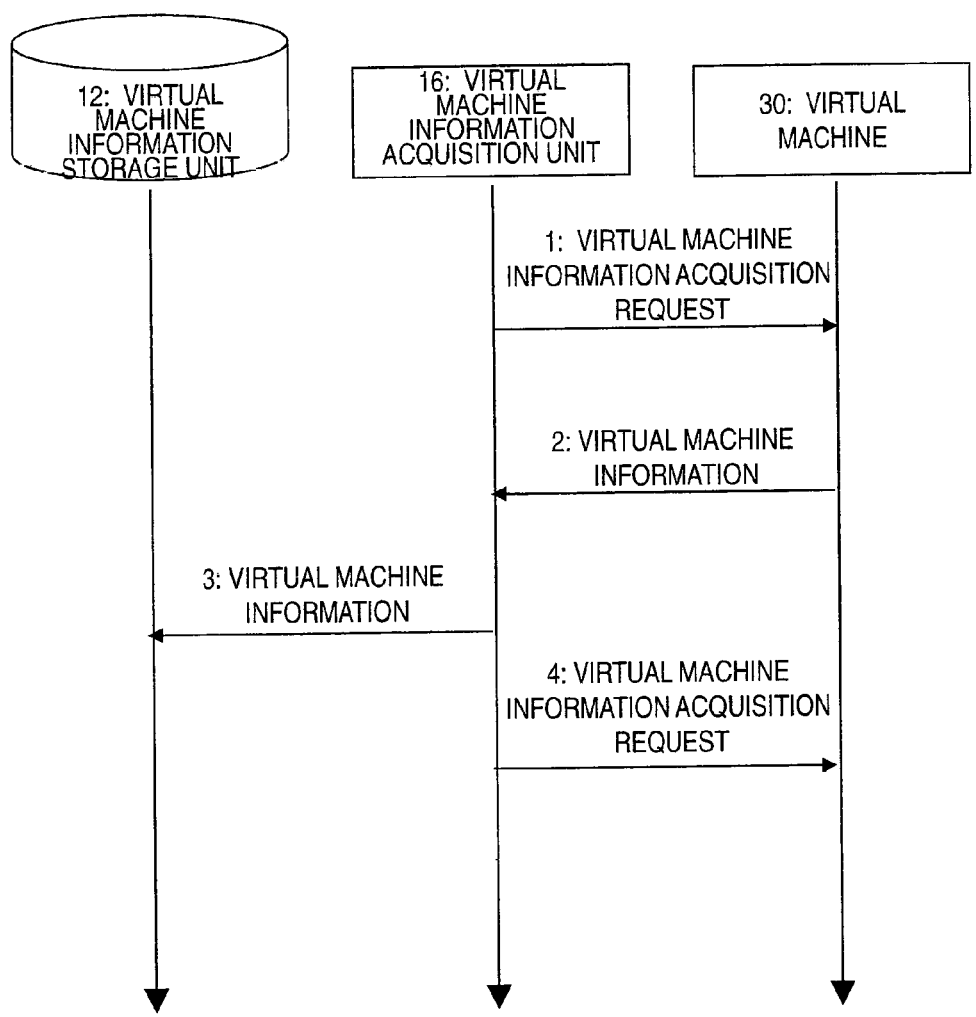
FIG. 6 is a sequence diagram illustrating an operation (virtual machine information acquisition) in the first exemplary embodiment of the present invention.

FIG. 6 is a diagram illustrating an example of an operation sequence for acquisition of virtual machine information. Referring to FIG. 6, a number is given to each sequence. A numeral within parentheses at each end of sentences of the following description corresponds to the number for the sequence. The operation sequence for acquisition of the virtual machine information will be described, with reference to FIGS. 6 and 1. The virtual machine information acquisition unit 16 transmits a virtual machine information acquisition request to each virtual machine 30 (1). Then, the virtual machine information acquisition unit 16 acquires the virtual machine information from each virtual machine 30 (2). The virtual machine information acquisition unit 16 stores the virtual machine information in the virtual machine information storage unit 12 (3). The virtual machine information acquisition unit 16 transmits a virtual machine information acquisition request to each physical machine 30 periodically or when a predetermined event occurs to hold virtual machine information following up-to-date information including a change of the virtual machine 30 or the like (4).

Figure 7A:
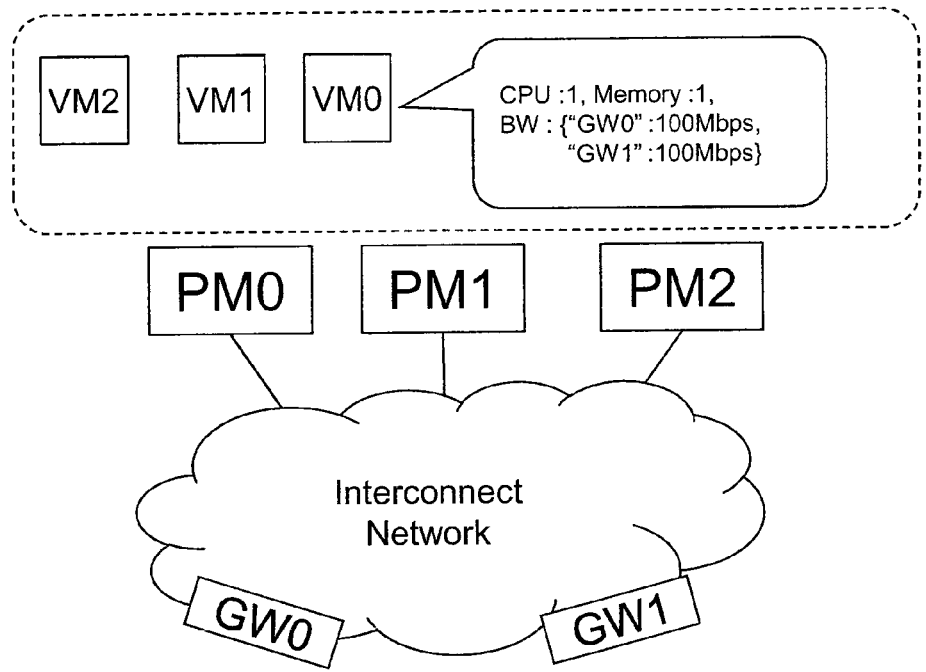
FIGS. 7A and 7B are diagrams schematically and respectively explaining receipt of VM performance and VM selection in the first exemplary embodiment of the present invention.

FIG. 7A is a diagram schematically illustrating reception of a requested resource (VM performance) in the first exemplary embodiment. Referring to FIG. 7A, physical machines PM0 to PM2 are connected to gateways GW0 and GW1 through an interconnect network (Interconnect Network). As illustrated in FIG. 7A, the requested resource for a virtual machine VM is indicated by:

CPU: 1;

memory (Memory): 1; and

BWs (bandwidths): bandwidths of the gateways GW0 and GW1 are both 100 Mbps (Megabits per seconds). "1s" in "CPU: 1" and "Memory: 1" respectively indicate a unit (unit of performance) of the CPU and a memory capacity unit (unit of capacity).

Figure 7B:
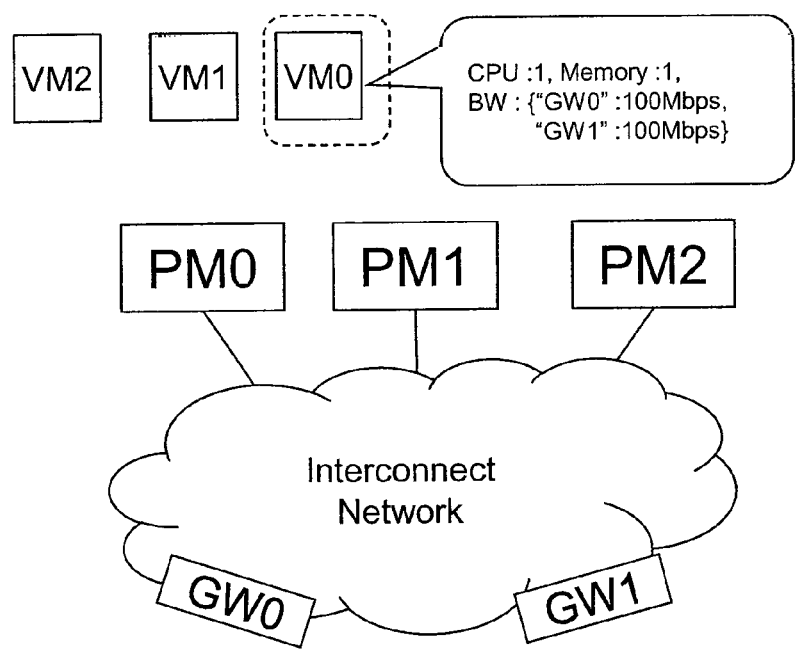

FIG. 7B is a diagram illustrating selection of the virtual machine (VM) (in step S2 in FIG. 2) in the first exemplary embodiment. In the example in FIG. 7B, VM0 is selected as one virtual machine (VM).

Figure 8A:
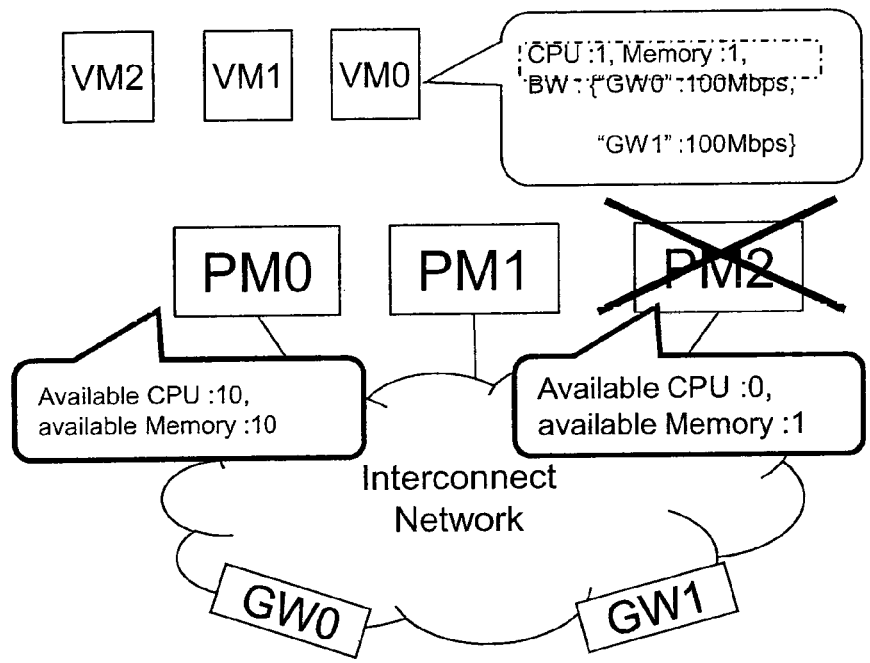
FIGS. 8A and 8B are diagrams schematically and respectively explaining physical machine (PM) filtering and computation of a matrix of traffic that will be generated for a group of filtered PMs in the first exemplary embodiment of the present invention.

FIG. 8A is a diagram schematically illustrating selection of physical machine (PM filtering) in the first exemplary embodiment. In the example in FIG. 8A, as an available resource, a CPU with a performance of 10 and a memory with a memory capacity of 10 are available on a physical machine PM0. A CPU with a performance of 0 and a memory with a memory capacity of 1 are available on a physical machine PM2. On the physical machine PM2, CPU resources are all allocated among the other VMs, so that there is no available CPU on the physical machine PM2. In this case, the physical machine PM0 is selected, and the physical machine PM2 is excluded from the selection. Though an available resource on the physical machine PM1 is not shown, the physical machine PM1 can be a candidate for the selection if the physical machine PM1 conforms to a condition specified by the requested resource.

Figure 8B:
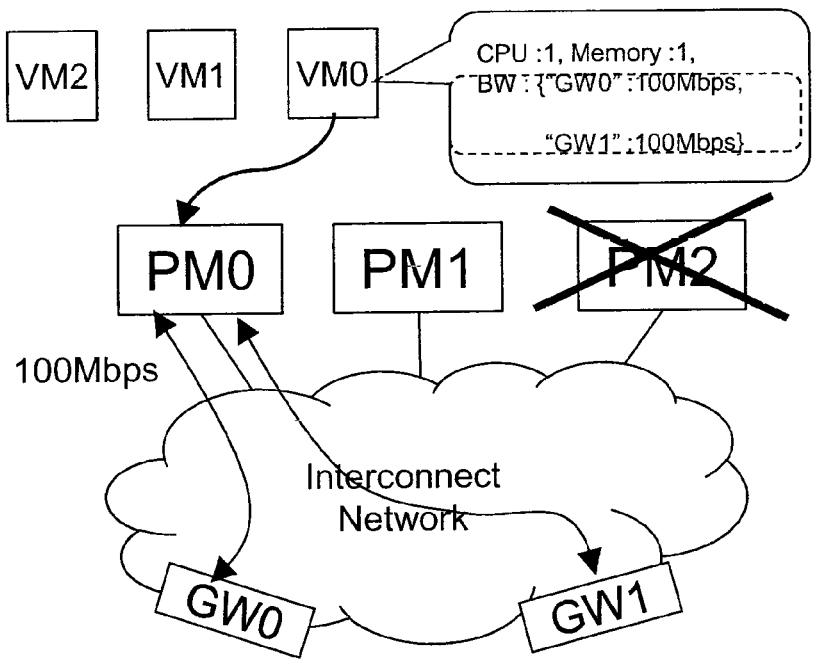

FIG. 8B is a diagram schematically illustrating computation of a generated traffic volume for a link of a network path from a transmission source to a destination when the VM arrangement destination computation unit 14 in FIG. 1 arranges the virtual machine (VM) on the physical machine (PM) obtained by filtering. As illustrated in FIG. 8B, the virtual machine VM0 is arranged on the physical machine PM0, and a generated traffic volume for a link between the physical machine PM0 and each of the gateways GW0 and GW1 is predicted.

Figure 9A:
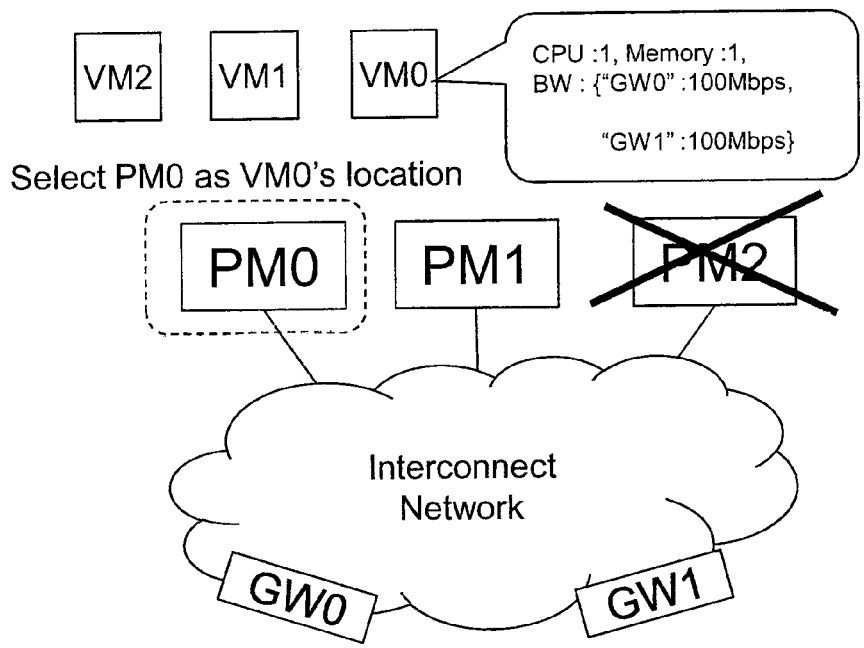
FIGS. 9A and 9B are diagrams schematically and respectively explaining selection of a PM with which link utilizations are most balanced and subsequent VM selection in the first exemplary embodiment of the present invention.

FIG. 9A is a diagram illustrating selection of the physical machine PM0 by the VM arrangement destination computation unit 14 in FIG. 1 in the first exemplary embodiment, wherein PM0 is a physical machine (PM) with which estimation link utilizations computed from link utilizations and the generated traffic volume are most balanced in the network. Each estimation link utilization is computed from a link utilization and a generated traffic volume, a balance degree with respect to the estimation link utilization in the network is computed, and the physical machine (PM) that achieves the highest balance degree is selected. In this case, the physical machine PM0 is selected as the arrangement destination of the virtual machine VM0.

Figure 9B:
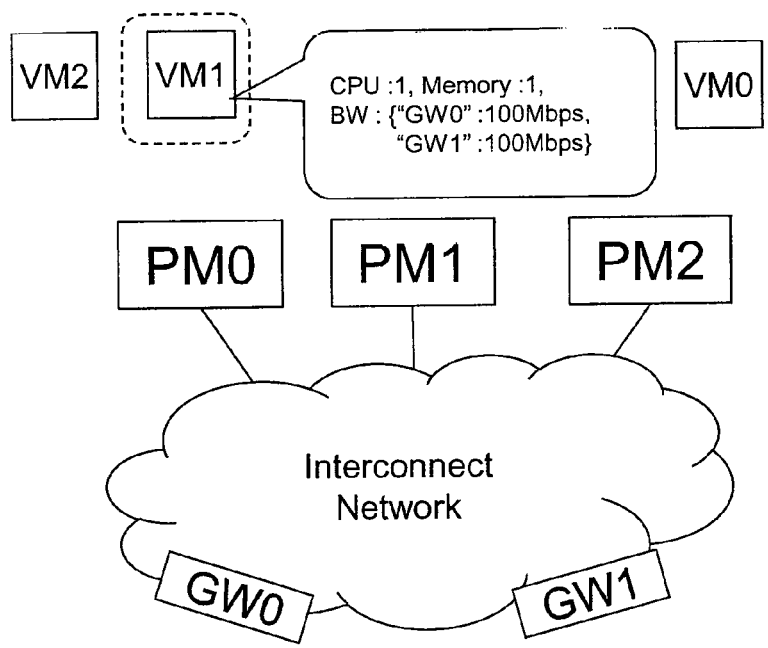

After arrangement of the virtual machine VM0 on the physical machine PM0 has been determined, the arrangement destination of the virtual machine VM1 to be subsequently arranged is determined based on a requested resource, as illustrated in FIG. 9B. Hereinafter, processes from FIG. 7A to FIG. 9A are repeated until arrangement of the virtual machine VM requested by the requested resource is all completed.

Figures 10A, 10B:
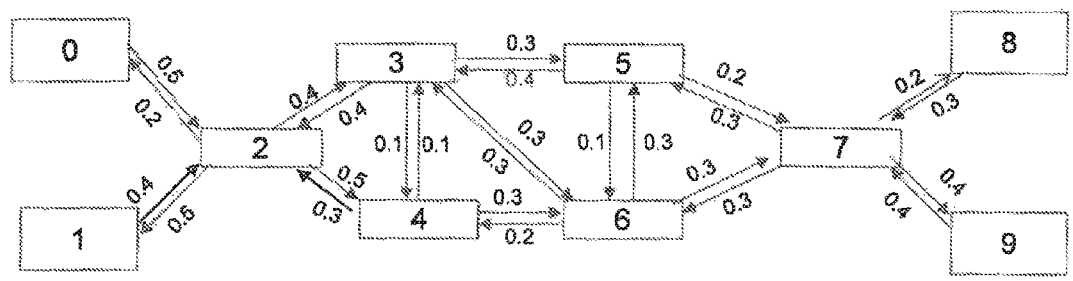
FIGS. 10A and 10B are respectively a diagram illustrating link utilizations in a network and a link utilization matrix in the first exemplary embodiment of the present invention.

FIG. 10A is a diagram schematically illustrating an example of a topology of a network (with the number of nodes of 10) constituted from nodes 0 to 9. Link utilization of each link is shown, corresponding to an arrow indicating the link that connects one node and another node. The link utilization is a value obtained by normalizing a traffic volume (amount of data flowing through a network) per unit time by a bandwidth. The link utilization is a value obtained by measurement. For example, the link utilization of 0.5 from the node 0 to the node 2 indicates that the traffic volume of the link from the node 0 to the node 2 per unit time is a half of the bandwidth, while the link utilization of 0.2 from the node 2 to the node 0 indicates that the traffic volume of the link from the node 2 to the node 0 per unit time is one fifth of the bandwidth.

FIG. 10B is a diagram illustrating a matrix of link utilizations (Link utilization matrix) associated with FIG. 10A. The link utilization matrix is a square matrix with the number of rows and the number of columns both being the same as the number of nodes (N: N=10 in FIG. 10B). An element in an ith row and a jth column of the link utilization matrix (i=1 to N, and j=1 to N) represents link utilization of a link from a node i to a node j. An element in a jth row and an ith column of the link utilization matrix indicates the link utilization of the link from the node j to the node i. The link utilizations are included in topology information that is acquired from the network 50 by the topology information acquisition unit 15 in FIG. 1 and is stored in the topology information storage unit 11, for example.

Figures 11A, 11B:
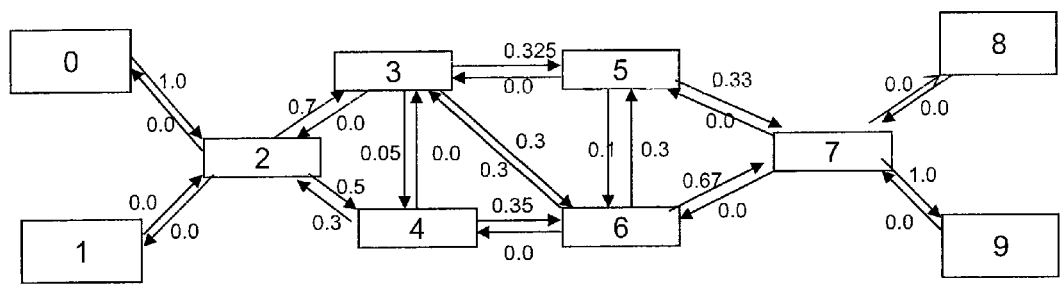
FIGS. 11A and 11B are diagrams explaining prediction of a generated traffic volume and a generated traffic matrix in the first exemplary embodiment of the present invention.

Next, the VM arrangement destination computation unit 14 in FIG. 1 finds a link selection probability for each link in FIG. 10A. FIG. 11A illustrates a link selection probability $P_{odij}$ of each link in the network in FIG. 10A (link selection probability of the link from the node i to the node j) when a transmission source is set to the node 0 (e.g., the physical machine PM0 in FIG. 8B with virtual machine VM0 arranged thereon) and a destination is set to the node 9 (e.g., the gateway GW0 in FIG. 8B). In the example in FIG. 11A, a link selection probability $P_{od02}$ of the link from the node 0 being the transmission source to the node 2, is 1 (indicating that the link is always selected).

An element $P_{odij}$ in an ith row and a jth column of a link selection probability matrix $P_{od}$ is a probability that a pair of a transmission source O and a destination D will use a certain link ij (link from the node i to the node j)(MLB (Multinominal Logit Based) routing protocol).

The element $P_{odij}$ in the ith row and the jth column of the link selection probability matrix $P_{od}$, i=1 to N, j=1 to N) can be expressed by the following equation (1):

$$P_{odij} = W_{oi} \times P_{ij} \times W_{jd} \div W_{od} \tag{1}$$

An element $W_{ij}$ in an ith row and a jth column of a matrix W (i=1 to N, and j=1 to N) is a matrix indicating a reachability from the node i to the node j. In the above equation (1), $W_{oi}$ indicates a reachability from a transmission source node o to the node i, $W_{jd}$ indicates a reachability from the node j to a destination node d, and $W_{od}$ indicates a reachability from the transmission source node o to the destination node d. An element $P_{ij}$ in an ith row and a jth column of a matrix P (i=1 to N, and j=1 to N) indicates a utility of the link from the node i to the node j. Each of these matrices W and P is computed from the link utilizations (refer to Non Patent Literatures 2 and 3).

Next, the VM arrangement destination computation unit 14 in FIG. 1 computes a generated traffic volume. A matrix obtained by multiplying each element of the link selection probability matrix ($P_{od}$) by a traffic volume between the transmission source and the destination is a generated traffic matrix (TM) (see FIG. 11B).

In the network with the number of the nodes of 10 in FIG. 10A, the link utilization matrix is represented by a square matrix of 10×10. Each of the link selection probability matrix ($P_{od}$) and the traffic matrix (TM) is represented by a square matrix of 10×10.

Next, the VM arrangement destination computation unit 14 computes an estimation link utilization (Estimated utilization) (using the following Equation (2)).

An estimation link utilization matrix (Estimation Utilization Matrix: EU) is a sum (sum of matrices) of the link utilization matrix (Link_util) and a matrix obtained by normalizing the traffic matrix (TM) by a bandwidth matrix (BW)(refer to FIG. 12). An element $bw_{ij}$ in an ith row and a jth column of the bandwidth matrix (BW)(i=1 to N and j =1 to N) is the bandwidth of the link from the node i to the node j.

$$EU_{ij} = \text{Link\_util}_{ij} + \frac{TM_{ij}}{bw_{ij}} \tag{2}$$

In the above equation (2), $EU_{ij}$ is an element in an ith row and a jth column of the estimation utilization matrix (EU), $Link\_util_{ij}$ is an element in the ith row and the jth column of the link utilization matrix (Link_util), $TM_{ij}$ is an element in an ith row and a jth column of the traffic matrix TM, and $bw_{ij}$ is the element in the ith row and the jth column of the bandwidth matrix BW (i=1 to N, and j=1 to N).

Next, the VM arrangement destination computation unit 14 in FIG. 1 computes the balance degree (link_variance) with respect to the estimation utilization matrix EU, using the following Equation (3):

$$\text{link\_variance} = \frac{\left(\sum_{i=1}^{N}\sum_{j=1}^{N} EU_{ij}\right)^2}{N \times \left(\sum_{i=1}^{N}\sum_{j=1}^{N} EU_{ij}^2\right)} \quad (3)$$

where N is the number of nodes (the number of rows (the number of columns) N of the estimation link utilization Matrix that is a square matrix).

The VM arrangement destination computation unit 14 in FIG. 1 selects the physical machine (PM) that achieves the highest value of the balance degree (closest to 1) obtained by Equation (3) in the estimation link utilization matrix obtained for a case wherein the virtual machine (VM) is arranged on each of the physical machines (PMs).

FIG. 11A, for example, illustrates the link selection probability $P_{odij}$ of each link when a transmission source is set to the node 0 and a destination is set to the node 9. This diagram corresponds to a case where the physical machine PM0 is arranged on the node 0 as the transmission source and the gateway GW0 is arranged on the node 9 as the destination in FIG. 8B, for example. In a case wherein the physical machine PM1 is arranged on the node 1, the balance degree with respect to the estimation link utilization matrix $EU_{ij}$ is computed, in a similar manner. Then, the VM arrangement destination computation unit 14 in FIG. 1 selects the physical machine PM that achieves the highest value of the balance degree (variance) with respect to the estimation link utilization matrix (EU) obtained by Equation (3)(that achieves the link utilizations which are most balanced (uniformized) among the links).

As a result, when the virtual machine that satisfies a required resource condition is arranged on the physical machine, occurrence of imbalance of a traffic volume in the network can be avoided, so that load distribution can be achieved.

<Second Exemplary Embodiment>

Next, a second exemplary embodiment of the present invention will be described. It is assumed that a system in the second exemplary embodiment has the same structure as the system illustrated in FIG. 1. In the second exemplary embodiment, a physical machine on which a virtual machine is to be arranged is selected, based on requested resource service information. FIGS. 13A to 13C and FIGS. 14A to 14C are diagrams illustrating a configuration of the second exemplary embodiment of the present invention.

Figure 13A:
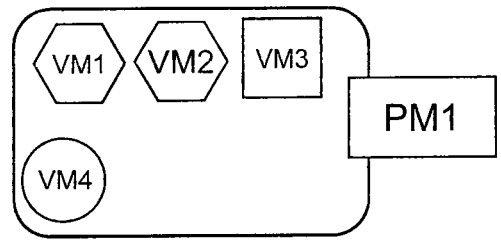
FIGS. 13A to 13C are diagrams explaining a second exemplary embodiment of the present invention.
Figure 13B:
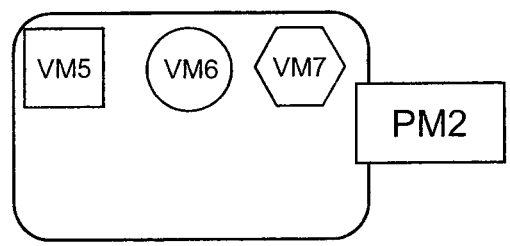
Figure 13C:
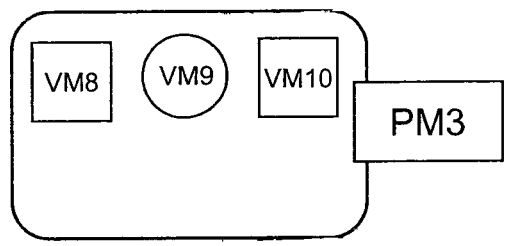
Figure 13C:
Figure 13C:
Figure 13C:

Referring to FIG. 13A, four virtual machines VM1 to VM4 are allocated on a physical machine PM1. The virtual machines VM1 and VM2 each provide a service A. The virtual machines VM3 and VM4 respectively provide a service B and a service C. Referring to FIG. 13B, three virtual machines VM5 to VM7 are allocated on a physical machine PM2. The virtual machines VM5, VM6, and VM7 respectively provide the service B, the service C, and the service A. Referring to FIG. 13C, three virtual machines VM8 to VM10 are allocated on a physical machine PM3. The virtual machines VM8 and VM10 each provide the service B, and the virtual machine VM9 provides the service C.

FIG. 14A illustrates allocation of each virtual machine that provides a service A to physical machines in the form of a table. Referring to FIG. 14A, 1, 2, and 3 in first to third rows indicate IDs for the physical machines, while numerals in first to 10th columns indicate IDs (1 to 10) for the virtual machines. In the example in FIG. 14A, virtual machines that provide the service A are virtual machines VM1 and VM2 on the physical machine PM1, and a virtual machine VM7 on the physical machine PM2. There is no virtual machine that provides the service A on the physical machine PM3. FIG. 14B illustrates allocation of each virtual machine that provides a service B to the physical machine in the form of a table. In the example in FIG. 14B, virtual machines that provide the service B is a virtual machine VM3 on the physical machine PM1, a virtual machine VM5 on the physical machine PM2, and virtual machines VM8 and VM10 on the physical machine PM3. FIG. 14C illustrates allocation of each virtual machine that provides a service C to the physical machine in the form of a table. In the example in FIG. 14C, virtual machines that provide the service C are a virtual machine VM4 on the physical machine PM1, a virtual machine VM6 on the physical machine PM2, and a virtual machine VM9 on the physical machine PM3. The tables (VM LOCATION MATRICES) in FIGS. 14A, 14B, and 14C are automatically generated by a VM allocation unit 18 or the like, using service information in virtual machine information (indicating which service is provided by each virtual machine) that is stored in a virtual machine information storage unit 12 and HOST location information (indicating on which physical machine each virtual machine is arranged).

When the requested resource is a request for arrangement of a virtual machine that provides the service A, the physical machine PM3 with the smallest number of the virtual machines VM that provide the service A is selected.

After the virtual machine VM has been selected, selection of the arrangement destination of the virtual machine VM may be performed in accordance with the above-mentioned first exemplary embodiment. That is, when the virtual machine VM is arranged on each of the physical machines PM that satisfy a performance condition specified by the requested resource, prediction of the generated traffic volume in a network may be performed, and the physical machine PM which will achieve the highest balance degree (variance) of estimation link utilizations (EUs) may be selected.

According to the second exemplary embodiment, by arranging the virtual machines that provide a preset service on the physical machines which are different to each other, imbalance caused by concentration of the virtual machines to a specific one of the physical machines can be avoided. Load distribution can be thereby achieved with respect to the service. Further, concentration of network traffic or the like can be avoided, so that load distribution can be achieved, as in the first exemplary embodiment.

The above description has been directed to each exemplary embodiment of the present invention. The invention is not limited to the above-mentioned exemplary embodiments, and further variation, substitution, and adjustment can be added. Each disclosure of the above-mentioned Patent Literatures and Non Patent Literatures is incorporated herein by reference. Modification and adjustment of each exemplary embodiment are possible within the scope of the overall disclosure (including the claims) of the present invention and based on the basic technical concept of the present invention. Various combinations and selections of various disclosed elements are possible within the scope of the claims of the present invention. That is, the present invention naturally includes various variations and modifications that could be made by those skilled in the art according to the overall disclosure including the claims and the technical concept.

What is claimed is:

1. A virtual machine arrangement design apparatus connected to a network, the apparatus comprising at least:
   a processor equipped with a memory, the processor executing a program stored in the memory to perform:
   a reception process to receive a requested resource;
   a virtual machine (VM) arrangement destination computation process to select one or more physical machines, on each of which the one or more virtual machine are arranged, based on the requested resource information received, wherein
   the VM arrangement destination computation process computes a link utilization matrix, where utilization of a link from a node i to a node j in the network is set to an element in an ith row and a jth column of the link utilization matrix (i=1 to N, and j=1 to N, N being the number of nodes in the network);
   computes a traffic matrix, based on a link selection probability matrix and a traffic volume between a transmission source and a destination;
   computes an estimation link utilization matrix, where an ith row and a jth column of the estimation link utilization matrix is obtained by summing an ith row and a jth column of the link utilization matrix and an ith row and a jth column of the traffic matrix divided by a bandwidth of the link from the node i to the node j;
   computes a balance degree (link variance) using the estimation link utilization matrix (EU);
   wherein the link variance is calculated using the equation:

$$\text{link\_variance} = \left(\sum_{i=1}^{N}\left(\sum_{j=1}^{N} EU_{ij}\right)^2\right) \bigg/ N \times \left(\sum_{i=1}^{N}\sum_{j=1}^{N} EU_{ij}^2\right)$$

where $EU_{ij}$ is the element in the ith row and the jth column of the estimation link utilization matrix (EU) (i=1 to N, and j=1 to N); and
select the physical machine that gives a highest variance of the estimation link utilization, based on the balance degree, and then set the physical machine as the arrangement destination of the virtual machine.

2. The virtual machine arrangement design apparatus according to claim 1, comprising:
   a topology information acquisition process that acquires topology information of the network; and
   a storage unit that stores the topology information acquired.

3. The virtual machine arrangement design apparatus according to claim 2, wherein
   the topology information of the network includes the link information of the network, wherein the link information includes, with respect to each link included in a path from the transmission source to the destination and having directivity,
information on a node connected to a start end of the link;
information on a node connected to a terminal end of the link;
a bandwidth of the link; and
a utilization of the link.

4. The virtual machine arrangement design apparatus according to claim 3, wherein
   the topology information of the network includes location information of the physical machine in the network.

5. The virtual machine arrangement design apparatus according to claim 3, wherein
   when a plurality of the physical machines are found to conform to the condition specified by the requested resource,
   the VM arrangement destination computation process arranges the virtual machine on each of the physical machines;
   computes a link utilization matrix (Link_util) where the utilization of the link from a node i to a node j in the network is set to an element in an ith row and a jth column of the link utilization matrix (Link_util)(i=1 to N, and j=1 to N, N being the number of nodes in the network);
   computes a link selection probability matrix Pod where an element Podij in an ith row and a jth column of the link selection probability matrix Pod (i=1 to N, and j=1 to N) is given as $$P_{oidj} = W_{oi} \times P_{ij} \times W_{jd} \div W_{od}$$

wherein a matrix W is given as a matrix where an element Wij in an ith row and a jth column of the matrix W (i=1 to N, and j=1 to N) indicates a reachability from the node i to the node j, and a matrix P is given as a matrix where an element Pij in an ith row and a jth column of the matrix P (i=1 to N, and j=1 to N) indicates a utility of the link from the node i to the node j;
computes a traffic matrix TM based on the link selection probability matrix Pod and the traffic volume between the transmission source and the destination;
computes an estimation link utilization matrix (EU)

$$EU_{ij} = \text{Link\_util}_{ij} + (TM_{ij} \div bw_{ij})$$

wherein the element EUij of the estimation link utilization matrix (EU) is given as a sum of an element $\text{Link\_util}_{ij}$ in the ith row and the jth column of the link utilization matrix (Link_util)(i=1 to N and j=1 to N) and a value obtained by dividing an element in an ith row and a jth column of the traffic matrix TM (i=1 to N and j=1 to N) by a bandwidth bwij of the link from the node i to the node j;
the VM arrangement destination computation process computes the balance degree (link_variance); and
based on a value of the balance degree obtained for each of the physical machines, the VM arrangement destination computation process select the physical machine that gives a highest variance of the estimation link utilization and set the physical machine to the arrangement destination of the virtual machine.

6. The virtual machine arrangement design apparatus according to claim 1, further comprising:

a physical machine information acquisition process that acquires information on the physical machine;

a virtual machine information acquisition process that acquires information on the virtual machine;

a first storage unit that stores the topology information;

a second storage unit that stores the information on the physical machines; and a third storage unit that stores the information on the virtual machine.

7. The virtual machine arrangement design apparatus according to claim 1, wherein the VM arrangement destination computation process arranges a plurality of the virtual machines configured to provide a same function or a same service on the physical machines wherein the physical machines are different.

8. A communication system comprising:

the virtual machine arrangement design apparatus as set forth in claim 1;

the physical machines connected to the virtual machine arrangement apparatus;

the virtual machines connected to the virtual machine arrangement apparatus; and a network connected to the virtual machine arrangement apparatus.

9. A method implemented by a computer for virtual machine arrangement design, the method comprising:

receiving a requested resource;

performing virtual machine (VM) arrangement destination computation that selects one or more physical machines on each of which one or more virtual machines each virtualizing a network function are arranged, based on the requested resource received, wherein the VM arrangement destination computation comprises:

computing a link utilization matrix, where utilization of a link from a node i to a node j in the network is set to an element in an ith row and a jth column of the link utilization matrix (i=1 to N, and j=1 to N, N being the number of nodes in the network);

computing a traffic matrix, based on a link selection probability matrix and a traffic volume between a transmission source and a destination;

computing an estimation link utilization matrix, where an ith row and a jth column of the estimation link utilization matrix is obtained by summing an ith row and a jth column of the link utilization matrix and an ith row and a jth column of the traffic matrix divided by a bandwidth of the link from the node i to the node j;

computing a balance degree (link variance) using the estimation link utilization matrix (EU);

wherein the link variance is calculated using the equation:

$$\text{link\_variance} = \left( \sum_{i=1}^{N} \left( \sum_{j=1}^{N} EU_{ij} \right)^2 \right) / N \times \left( \sum_{i=1}^{N} \sum_{j=1}^{N} EU_{ij}^2 \right)$$

where EUij is the element in the ith row and the jth column of the estimation link utilization matrix (EU) (i=1 to N, and j=1 to N); and selecting the physical machine that gives a highest variance of the estimation link utilization, based on the balance degree, and then sets the physical machine as the arrangement destination of the virtual machine.

10. The method according to claim 9, comprising:

acquiring topology information of the network; and storing the acquired topology information in a storage unit.

11. The method according to claim 10, wherein the topology information of the network includes link information of the network, wherein the link information includes, with respect to each link included in a path from the transmission source to the destination and having directivity, information on a node connected to a start end of the link;

information on a node connected to a terminal end of the link;

a bandwidth of the link; and a utilization of the link.

12. The method according to claim 11, wherein the topology information of the network includes location information of the physical machine in the network.

13. The method according to claim 11, wherein in the VM arrangement destination computation comprises:

when a plurality of the physical machines are found to conform to the condition specified by the requested resource comprise a plurality of the physical machines, arranging the virtual machine on each of the physical machines;

calculating a link utilization matrix (Link_util), where the utilization of the link from a node i to a node j in the network is set to an element in an ith row and a jth column of the link utilization matrix (Link$_{util)(i=}$1 to N, and j=1 to N, N being the number of nodes in the network);

computing a link selection probability matrix $P_{od}$, where an element $P_{odij}$ in an ith row and a jth column of the link selection probability matrix $P_{od}$ (i=1 to N, and j=1 to N) is given as:

$$P_{odij} = W_{oi} \times P_{ij} \times W_{jd} \div W_{od}$$

wherein a matrix W is given as a matrix where an element $W_{ij}$ in an ith row and a jth column of the matrix W (i=1 to N, and j=1 to N) indicates a reachability from the node i to the node j, and a matrix P is given as a matrix where an element $P_{ij}$ in an ith row and a jth column of the matrix P (i=1 to N, and j=1 to N) indicates a utility of the link from the node i to the node j;

computing a traffic matrix TM, based on the link selection probability matrix $P_{od}$ and the traffic volume between the transmission source and the destination;

computing an estimation link utilization matrix (EU), where an element $EU_{ij}$ in an ith row and a jth column of the estimation link utilization matrix (i =1 to N, and j =1 to N) is set, using the following equation:

$$EU_{ij} = \text{Link\_util}_{ij} + \frac{TM_{ij}}{bw_{ij}}$$

wherein the element $EU_{ij}$ of the estimation link utilization matrix (EU) is given as a sum of an element in the ith row and the jth column of the link utilization matrix (Link_util) (i=1 to N and j=1 to N) and a value obtained by dividing an element in an ith row and a jth column of the traffic matrix TM (i=1 to N and j=1 to N) by a bandwidth $bw_{ij}$ of the link from the node i to the node j;

computing the balance degree (link_variance) with respect to the estimation link utilization matrix (EU), using the following equation:

$$\text{link\_variance} = \frac{\left(\sum_{i=1}^{N}\sum_{j=1}^{N} EU_{ij}\right)^2}{N \times \left(\sum_{i=1}^{N}\sum_{j=1}^{N} EU_{ij}^2\right)}$$

where $EU_{ij}$ is the element in the ith row and the jth column of the estimation link utilization matrix (EU)(i=1 to N, and j=1 to N); and selecting the physical machine that gives a highest variance of the estimation link utilization based on a value of the balance degree obtained for each of the physical machines and setting the selected physical machine as the arrangement destination of the virtual machine.

14. The method according to claim 9, further comprising:
acquiring information on the physical machine;
acquiring information on the virtual machine;
storing the information on the physical machine in a storage unit; and
storing the information on the virtual machine in a storage unit.

15. The method according to claim 9, comprising:
arranging a plurality of the virtual machines configured to provide a same function or a same service on the physical machines that are different.

16. A non-transitory computer-readable recording medium that stories therein an executable program to cause a computer of a virtual machine arrangement design apparatus to execute:
a process that receives a requested resource; and
a virtual machine (VM) arrangement destination computation process that selects one or more physical machines on each of which one or more virtual machines each virtualizing a network function are arranged, based on the requested resource received, wherein
the VM arrangement destination computation process comprises:
computing a link utilization matrix, where utilization of a link from a node i to a node j in the network is set to an element in an ith row and a jth column of the link utilization matrix (i=1 to N, and j=1 to N, N being the number of nodes in the network);
computing a traffic matrix, based on a link selection probability matrix and a traffic volume between a transmission source and a destination;
computing an estimation link utilization matrix, where an ith row and a jth column of the estimation link utilization matrix is obtained by summing an ith row and a jth column of the link utilization matrix and an ith row and a jth column of the traffic matrix divided by a bandwidth of the link from the node i to the node j;
computing a balance degree (link variance) using the estimation link utilization matrix (EU);
wherein the link variance is calculated using the equation:

$$\text{link\_variance} = \left(\sum_{i=1}^{N}\left(\sum_{j=1}^{N} EU_{ij}\right)^2\right) / N \times \left(\sum_{i=1}^{N}\sum_{j=1}^{N} EU_{ij}^2\right)$$

where EUij is the element in the ith row and the jth column of the estimation link utilization matrix (EU) (i=1 to N, and j=1 to N); and selecting the physical machine that gives a highest variance of the estimation link utilization, based on the balance degree, and then sets the physical machine as the arrangement destination of the virtual machine.

17. The non-transitory computer-readable recording medium according to claim 16, wherein the executable program stored thereon causes the computer to execute:
a process that acquires topology information of the network; and
a process that stores the acquired topology information in a storage unit.

18. The non-transitory computer-readable recording medium according to claim 17, wherein
the topology information of the network includes link information of the network, wherein
the link information includes, with respect to each link included in a path from the transmission source to the destination and having directivity,
information on a node connected to a start end of the link;
information on a node connected to a terminal end of the link;
a bandwidth of the link; and
a utilization of the link.

19. The non-transitory computer-readable recording medium according to claim 18, wherein
the topology information of the network includes location information of the physical machine in the network.

20. The non-transitory computer-readable recording medium according to claim 18, wherein
the VM arrangement destination computation process comprises:
when a plurality of the physical machines are found to conform to the condition specified by the requested resource,
arranging the virtual machine on the physical machines;
computes a link utilization matrix (Link_util), where the utilization of the link from a node i to a node j in the network is set to an element in an ith row and a jth column of the link utilization matrix (Link_util)(i=1 to N, and j=1 to N, N being the number of nodes in the network);
computing a link selection probability matrix $P_{od}$, where an element $P_{odij}$ in an ith row and a jth column of the link selection probability matrix $P_{od}$ (i=1 to N, and j=1 to N) is given as:

$$P_{odij} = W_{oi} \times P_{ij} \times W_{jd} \div W_{od}$$

in which a matrix W is given as a matrix where an element $W_{ij}$ in an ith row and a jth column of the matrix W (i=1 to N, and j=1 to N) indicates a reachability from the node i to the node j, and a matrix P is given as a matrix where an element $P_{ij}$ in an ith row and a jth column of the matrix P (i=1 to N, and j=1 to N) indicates a utility of the link from the node i to the node j;
computing a traffic matrix TM, based on the link selection probability matrix $P_{od}$ and the traffic volume between the transmission source and the destination;
computing an estimation link utilization matrix (EU), where an element $EU_{ij}$ in an ith row and a jth column of the estimation link utilization matrix (EU)(i=1 to N, and j=1 to N) is set, using the following equation:

$$EU_{ij} = \text{Link\_util}_{ij} + \frac{TM_{ij}}{bw_{ij}}$$

wherein the element $EU_{ij}$ of the estimation link utilization matrix (EU) is given as a sum of an element in the ith row and the jth column of the link utilization matrix (Link_util)(i=1 to N and j=1 to N) and a value obtained by dividing an element in an ith row and a jth column of the traffic matrix TM (i=1 to N and j=1 to N) by a bandwidth $bw_{ij}$ of the link from the node i to the node j;

computing the balance degree (link_variance) with respect to the estimation link utilization matrix (EU) using the following equation:

$$\text{link\_variance} = \frac{\left(\sum_{i=1}^{N}\sum_{j=1}^{N} EU_{ij}\right)^2}{N \times \left(\sum_{i=1}^{N}\sum_{j=1}^{N} EU_{ij}^2\right)}$$

where $EU_{ij}$ is the element in the ith row and the jth column of the estimation link utilization matrix (EU)(i=1 to N, and j=1 to N); and selecting the physical machine that gives a highest variance of the estimation link utilization based on a value of the balance degree obtained for each of the physical machines, and set the physical machine as the arrangement destination of the virtual machine.

21. The non-transitory computer-readable recording medium according to claim 16, wherein the executable program stored thereon causes the computer to execute:
a process that acquires information on the physical machine;
a process that acquires information on the virtual machine;
a process that stores the information on the physical machine in a storage unit; and
a process that stores the information on the virtual machine in a storage unit.

22. The non-transitory computer-readable recording medium according to any one of claim 16, wherein
the VM arrangement destination computation process arranges a plurality of the physical machines configured to provide a same function or a same service on the physical machines that are different.

23. A virtual machine arrangement design apparatus comprising at least:
a processor equipped with a memory, the processor executing a program stored in the memory to perform a reception process that receives a requested resource; and
a virtual machine (VM) arrangement destination computation process that selects one or more physical machines, on each of which the one or more virtual machine are arranged, based on the requested resource information received, wherein
the VM arrangement destination computation process predicts traffic volume flowing through a network with the physical machine connected thereto in a case wherein the virtual machine is arranged on the physical machine conforming to a condition specified by the requested resource, and selects the physical machine that balances a link utilization of the network as an arrangement destination of the virtual machine, based on the predicted traffic volume, wherein the VM arrangement destination computation process comprises:

a VM allocation process that performs allocation of each of the virtual machines, and
a topology information acquisition process that acquires topology information of the network; and
a storing process that stores the topology information acquired in a storage unit,
wherein the topology information of the network includes link information of the network,
wherein the link information includes, with respect to each link included in a path from the transmission source to the destination and having directivity,
information on a node connected to a start end of the link;
information on a node connected to a terminal end of the link;
a bandwidth of the link; and
a utilization of the link,
wherein when a plurality of the physical machines are found to conform to the condition specified by the requested resource,
the VM arrangement destination computation process arranges the virtual machine on each of the physical machines;
computes a link utilization matrix (Link_util) where the utilization of the link from a node i to a node j in the network is set to an element in an ith row and a jth column of the link utilization matrix (Link_util)(i=1 to N, and j=1 to N, N being the number of nodes in the network);
computes a link selection probability matrix $P_{od}$ where an element $P_{odij}$ in an ith row and a jth column of the link selection probability matrix $P_{od}$ (i=1 to N, and j=1 to N) is given as:

$$P_{odij} = W_{oi} \times P_{ij} \times W_{jd} \div W_{od}$$

wherein a matrix W is given as a matrix where an element $W_{ij}$ in an ith row and a jth column of the matrix W (i=1 to N, and j=1 to N) indicates a reachability from the node i to the node j, and a matrix P is given as a matrix where an element $P_{ij}$ in an ith row and a jth column of the matrix P (i=1 to N, and j=1 to N) indicates a utility of the link from the node i to the node j;
computes a traffic matrix TM based on the link selection probability matrix $P_{od}$ and the traffic volume between the transmission source and the destination;
computes an estimation link utilization matrix (EU) where an element $EU_{ij}$ in an ith row and a jth column of the estimation link utilization matrix (EU)(i=1 to N, and j=1 to N) is given as the following equation:

$$EU_{ij} = \text{Link\_util}_{ij} + \frac{TM_{ij}}{bw_{ij}}$$

wherein the element $EU_{ij}$ of the estimation link utilization matrix (EU) is given as a sum of an element Link_util$_{ij}$ in the ith row and the jth column of the link utilization matrix (Link_util)(i=1 to N and j=1 to N) and a value obtained by dividing an element in an ith row and a jth column of the traffic matrix TM (i=1 to N and j=1 to N) by a bandwidth $bw_{ij}$ of the link from the node i to the node j;

the VM arrangement destination computation process next computes a balance degree (link$_{13}$ variance) with respect to the estimation link utilization matrix (EU), using the following equation:

$$\text{link\_variance} = \frac{\left(\sum_{i=1}^{N} \sum_{j=1}^{N} EU_{ij}\right)^2}{N \times \left(\sum_{i=1}^{N} \sum_{j=1}^{N} EU_{ij}^2\right)}$$

where $EU_{ij}$ is the element in the ith row and the jth column of the estimation link utilization matrix (EU) (i=1 to N, and j=1 to N); and based on a value of the balance degree obtained for each of the physical machines, the VM arrangement destination computation process selects the physical machine that gives a highest variance of the estimation link utilization and sets the physical machine to the arrangement destination of the virtual machine.

24. A method implemented by a computer for virtual machine arrangement design, the method comprising:

receiving a requested resource; and performing a virtual machine (VM) arrangement destination computation that selects one or more physical machines, on each of which the one or more virtual machine are arranged, based on the requested resource information received, wherein the VM arrangement destination computation comprises:

predicting traffic volume flowing through a network with the physical machine connected thereto in a case wherein the virtual machine is arranged on the physical machine conforming to a condition specified by the requested resource;

selecting the physical machine that balances a link utilization of the network as an arrangement destination of the virtual machine, based on the predicted traffic volume;

performing VM allocation process that performs allocation of each of the virtual machines; and a topology information acquisition process that acquires topology information of the network; and storing in a storage unit the topology information acquired, wherein the topology information of the network includes link information of the network, wherein the link information includes, with respect to each link included in a path from the transmission source to the destination and having directivity, information on a node connected to a start end of the link;

information on a node connected to a terminal end of the link;

a bandwidth of the link; and a utilization of the link, wherein when a plurality of the physical machines are found to conform to the condition specified by the requested resource, the VM arrangement destination computation performs:

arranging the virtual machine on each of the physical machines;

computing a link utilization matrix (Link_util) wherein the utilization of the link from a node i to a node j in the network is set to an element in an ith row and a jth column of the link utilization matrix (Link_util)(i=1 to N, and j=1 to N, N being the number of nodes in the network);

computing a link selection probability matrix P$_{od}$ wherein an element P$_{odij}$ in an ith row and a jth column of the link selection probability matrix P$_{od}$ (i=1 to N, and j=1 to N) is given as:

$$P_{odij} = W_{oi} \times P_{ij} \times W_{jd} \div W_{od}$$

wherein a matrix W is given as a matrix where an element $W_{ij}$ in an ith row and a jth column of the matrix W (i=1 to N, and j=1 to N) indicates a reachability from the node i to the node j, and a matrix P is given as a matrix where an element $P_{ij}$ in an ith row and a jth column of the matrix P (i =1 to N, and j =1 to N) indicates a utility of the link from the node i to the node j;

computing a traffic matrix TM based on the link selection probability matrix P$_{od}$ and the traffic volume between the transmission source and the destination;

computing an estimation link utilization matrix (EU) where an element $EU_{ij}$ in an ith row and a jth column of the estimation link utilization matrix (EU)(i =1 to N, and j =1 to N) is given as the following equation:

$$EU_{ij} = \text{Link\_util}_{ij} + \frac{TM_{ij}}{bw_{ij}}$$

wherein the element $EU_{ij}$ of the estimation link utilization matrix (EU) is given as a sum of an element Link_util$_{ij}$ in the ith row and the jth column of the link utilization matrix (Link_util)(i=1 to N and j=1 to N) and a value obtained by dividing an element in an ith row and a jth column of the traffic matrix TM (i=1 to N and j=1 to N) by a bandwidth $bw_{ij}$ of the link from the node i to the node j;

computing a balance degree (link_variance) with respect to the estimation link utilization matrix (EU), using the following equation:

$$\text{link\_variance} = \frac{\left(\sum_{i=1}^{N} \sum_{j=1}^{N} EU_{ij}\right)^2}{N \times \left(\sum_{i=1}^{N} \sum_{j=1}^{N} EU_{ij}^2\right)}$$

wherein $EU_{ji}$ is the element in the ith row and the jth column of the estimation link utilization matrix (EU) (i=1 to N, and j=1 to N); and selecting, based on a value of the balance degree obtained for each of the physical machines, the physical machine that gives a highest variance of the estimation link utilization and sets the physical machine to the arrangement destination of the virtual machine.

25. A non-transitory computer-readable recording medium that stories therein an executable program to cause a computer of a virtual machine arrangement design apparatus to execute:

a process that receives a requested resource; and a virtual machine (VM) arrangement destination computation process that selects one or more physical machines, on each of which the one or more virtual machine are arranged, based on the requested resource information received, wherein the VM arrangement destination computation process predicts traffic volume flowing through a network with the physical machine connected thereto in a case wherein the virtual machine is arranged on the physical machine conforming to a condition specified by the requested resource, and selects the physical machine that balances a link utilization of the network as an arrangement destination of the virtual machine, based on the predicted traffic volume, wherein the VM arrangement destination computation process executes:

a VM allocation process that performs allocation of each of the virtual machines, and a topology information acquisition process that acquires topology information of the network; and a storing process that stores in a storage unit the topology information acquired, wherein the topology information of the network includes link information of the network, wherein the link information includes, with respect to each link included in a path from the transmission source to the destination and having directivity, information on a node connected to a start end of the link;

information on a node connected to a terminal end of the link;

a bandwidth of the link; and a utilization of the link, wherein when a plurality of the physical machines are found to conform to the condition specified by the requested resource, the VM arrangement destination computation process performs:

arranging the virtual machine on each of the physical machines;

computing a link utilization matrix (Link_util) wherein the utilization of the link from a node i to a node j in the network is set to an element in an ith row and a jth column of the link utilization matrix (Link_util)(i=1 to N, and j=1 to N, N being the number of nodes in the network);

computing a link selection probability matrix $P_{od}$ wherein an element $P_{odij}$ in an ith row and a jth column of the link selection probability matrix $P_{od}$ (i=1 to N, and j=1 to N) is given as:

$$P_{odij} = W_{oi} \times P_{ij} \times W_{jd} \div W_{od}$$

wherein a matrix W is given as a matrix where an element $W_{ij}$ in an ith row and a jth column of the matrix W (i=1 to N, and j=1 to N) indicates a reachability from the node i to the node j, and a matrix P is given as a matrix where an element $P_{ij}$ in an ith row and a jth column of the matrix P (i=1 to N, and j=1 to N) indicates a utility of the link from the node i to the node j, computing a traffic matrix TM based on the link selection probability matrix $P_{od}$ and the traffic volume between the transmission source and the destination;

computing an estimation link utilization matrix (EU) where an element $EU_{ij}$ in an ith row and a jth column of the estimation link utilization matrix (EU)(i=1 to N, and j=1 to N) is given as the following equation:

$$EU_{ij} = \text{Link\_util}_{ij} + \frac{TM_{ij}}{bw_{ij}}$$

wherein the element $EU_{ij}$ of the estimation link utilization matrix (EU) is given as a sum of an element $\text{Link\_util}_{ij}$ in the ith row and the jth column of the link utilization matrix (Link_util)(i=1 to N and j=1 to N) and a value obtained by dividing an element in an ith row and a jth column of the traffic matrix TM (i=1 to N and j=1 to N) by a bandwidth $bw_{ij}$ of the link from the node i to the node j;

computing a balance degree (link_variance) with respect to the estimation link utilization matrix (EU), using the following equation:

$$\text{link\_variance} = \frac{\left(\sum_{i=1}^{N} \sum_{j=1}^{N} EU_{ij}\right)^2}{N \times \left(\sum_{i=1}^{N} \sum_{j=1}^{N} EU_{ij}^2\right)}$$

wherein $EU_{ij}$ is the element in the ith row and the jth column of the estimation link utilization matrix (EU) (i=1 to N, and j=1 to N); and selecting, based on a value of the balance degree obtained for each of the physical machines, the physical machine that gives a highest variance of the estimation link utilization and sets the physical machine to the arrangement destination of the virtual machine.

* * * * *